(12) United States Patent
Morishima

(10) Patent No.: US 7,558,169 B2
(45) Date of Patent: Jul. 7, 2009

(54) DISCS, IMAGE FORMING METHODS AND OPTICAL DISC APPARATUSES FOR FORMING A MULTI-COLOR IMAGE IN A COLOR FORMING LAYER ON AN OPTICAL DISK

(75) Inventor: Morito Morishima, Fukuroi (JP)

(73) Assignee: Yamaha Corporation, Hamamatsu-shi (JP)

( * ) Notice: Subject to any disclaimer, the term of this patent is extended or adjusted under 35 U.S.C. 154(b) by 124 days.

(21) Appl. No.: 10/387,987

(22) Filed: Mar. 13, 2003

(65) Prior Publication Data

US 2003/0179679 A1 Sep. 25, 2003

(30) Foreign Application Priority Data

Mar. 13, 2002 (JP) ............................ P2002-069097

(51) Int. Cl.
*G11B 7/00* (2006.01)
(52) U.S. Cl. ................................. 369/44.35
(58) Field of Classification Search ................. 369/108; 347/224, 345; G11B 7/00; B41J 2/435
See application file for complete search history.

(56) References Cited

U.S. PATENT DOCUMENTS

| | | | | | |
|---|---|---|---|---|---|
| 5,317,337 | A | * | 5/1994 | Ewaldt | ............................ 347/2 |
| 5,381,221 | A | * | 1/1995 | Mizoguchi et al. | ............ 399/40 |
| 5,838,653 | A | * | 11/1998 | Fan et al. | ................. 369/275.1 |
| 6,264,295 | B1 | * | 7/2001 | Bradshaw et al. | .............. 347/2 |
| 6,578,875 | B2 | * | 6/2003 | Tamura et al. | .............. 283/114 |
| 6,771,297 | B2 | * | 8/2004 | Bronson | ..................... 347/224 |
| 6,778,205 | B2 | * | 8/2004 | Anderson et al. | ........... 347/251 |
| 6,816,334 | B2 | * | 11/2004 | Watanabe et al. | ......... 360/77.03 |
| 6,862,033 | B2 | * | 3/2005 | McClellan | ................... 347/224 |
| 7,015,939 | B2 | * | 3/2006 | Honda et al. | ................. 347/225 |
| 7,050,365 | B2 | * | 5/2006 | Morishima | .............. 369/44.32 |
| 7,082,094 | B2 | * | 7/2006 | Morishima et al. | .......... 369/116 |

FOREIGN PATENT DOCUMENTS

| | | |
|---|---|---|
| EP | 1108550 A1 | 8/1999 |
| EP | 1114736 A1 | 8/1999 |
| JP | 10-320963 | 12/1998 |
| JP | 2000-71525 | 3/2000 |
| JP | 2000-155989 | 6/2000 |
| JP | 2000-173096 A | 6/2000 |

OTHER PUBLICATIONS

Notice for Reasons of Rejection for Corresponding 2002 Patent Application No. 069097, dated Jul. 11, 2006.

* cited by examiner

*Primary Examiner*—Joseph H Feild
*Assistant Examiner*—Christopher R Lamb
(74) *Attorney, Agent, or Firm*—Pillsbury Winthrop Shaw Pittman LLP

(57) ABSTRACT

Blue color forming sub-layer (205), green color forming sub-layer (206) and red color forming sub-layer (207) which start to form colors upon application of different amounts of energy are superposed on the image surface of optical disc (D). The color forming sub-layer which requires the smallest amount of energy to form color is first illuminated with laser of the power required to realize color formation from that sub-layer; subsequently, this sub-layer is illuminated with ultraviolet radiation to fix the color it has formed. Then, the next color forming sub-layer is illuminated with laser of the required power and after fixing the color it has formed, the last color forming sub-layer is illuminated with the required laser to form color.

18 Claims, 25 Drawing Sheets

FIG. 1
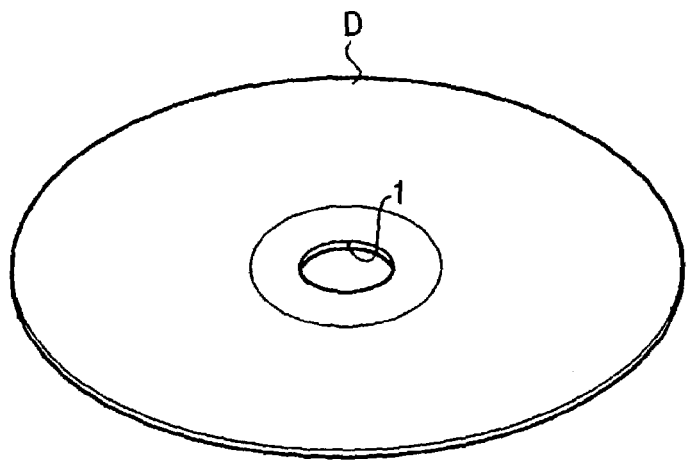
FIG. 2
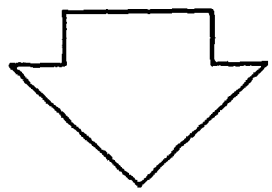
WRITE LASER APPLIED IN THIS DIRECTION
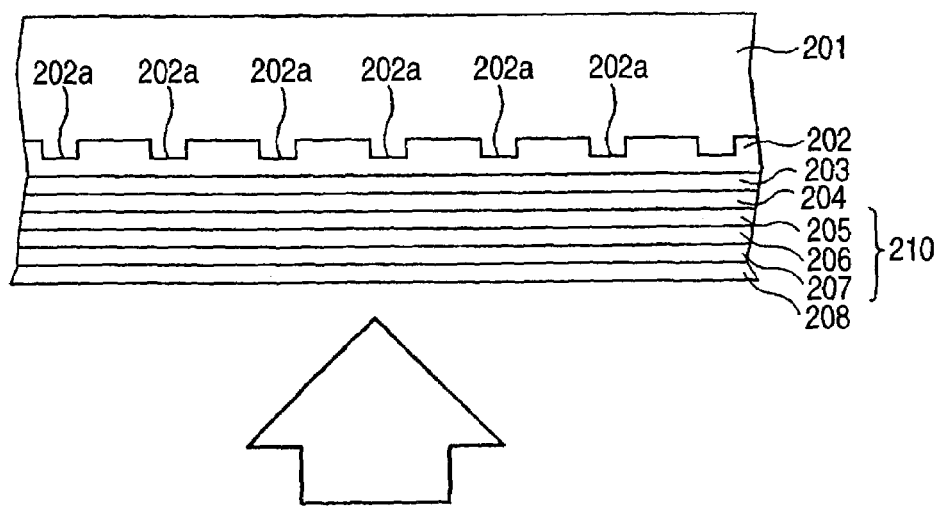
IMAGE FORMING LASER APPLIED IN THIS DIRECTION

FIG. 18
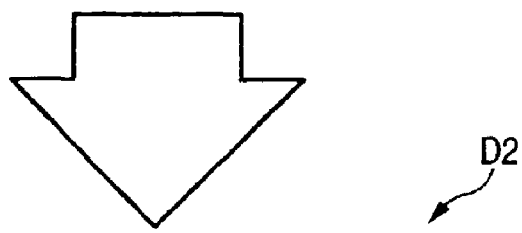
WRITE LASER APPLIED IN THIS DIRECTION
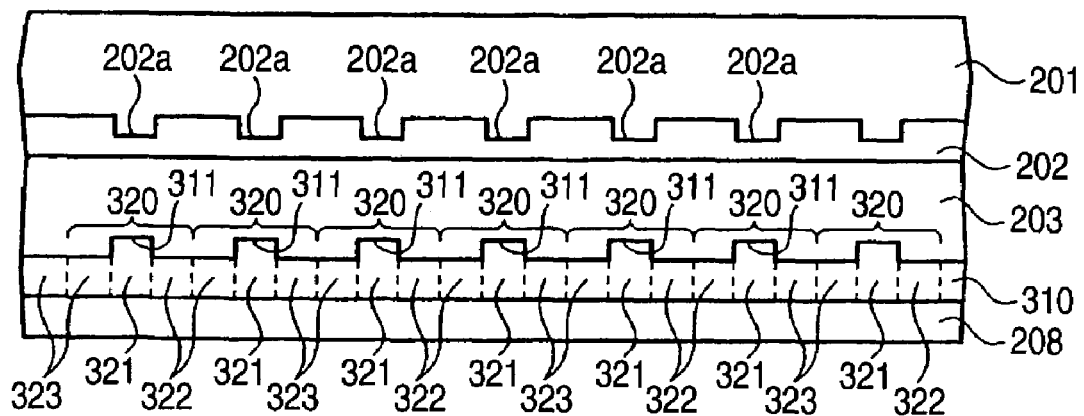
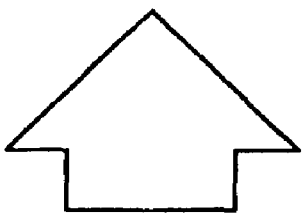
IMAGE FORMING LASER APPLIED IN THIS DIRECTION FIG. 25
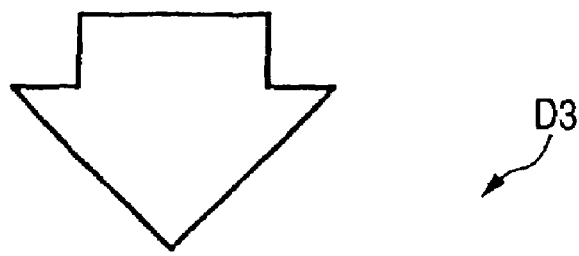
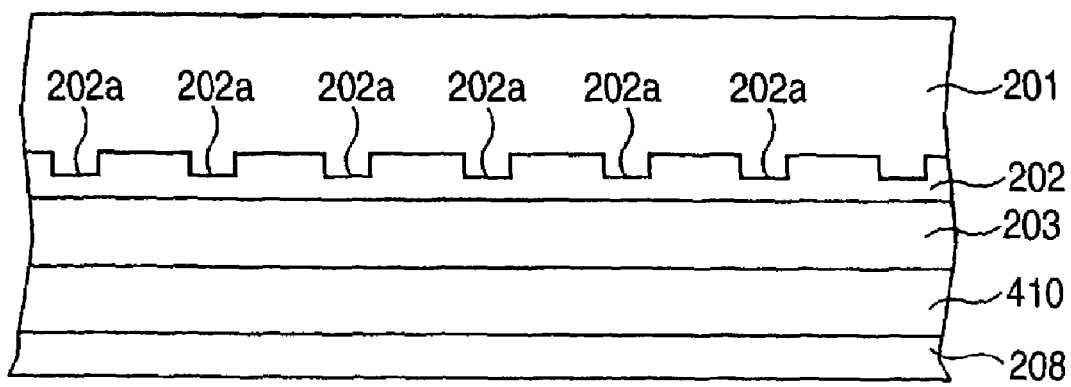
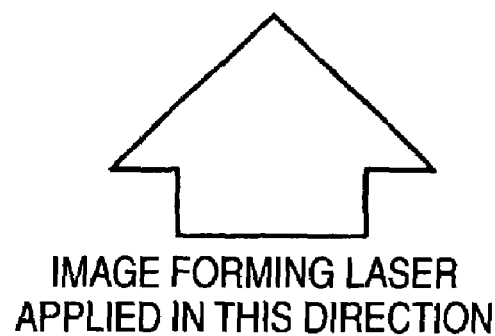

DISCS, IMAGE FORMING METHODS AND OPTICAL DISC APPARATUSES FOR FORMING A MULTI-COLOR IMAGE IN A COLOR FORMING LAYER ON AN OPTICAL DISK

BACKGROUND OF THE INVENTION

The present invention relates to a disc that can be illuminated with laser to form a visible image formed by more than one color, as well as an optical disc apparatus and an image forming method that can form a visible image on the disc on the basis of color image data.

Recordable optical discs such as CD-R (Compact disc-Recordable) and CD-RW (Compact disc-Rewritable) have been commercially and otherwise available. In order to record a variety of data such as music data on these optical discs, optical disc recording apparatuses such as CD-R drive and CD-R drive assemblies are used. In these optical disc apparatuses, information is recorded by illuminating the recording surface on one side of the optical disc with laser associated with the information to be recorded.

In some of these optical discs, the surface opposite the recording surface where music and other data are recorded is processed as by attaching labels on which is printed visible information such as the music title in the music data recorded on the recording surface and the title for identifying the recorded data. Such optical discs are produced by applying a print of the title or the like to a circular label sheet by a suitable means such as a printer and attaching the label sheet to the side of the optical disc opposite the recording surface.

However, in order to produce optical discs having desired visible information such as title recorded on the label's surface in the manner described above, a printer separate from the optical disc recording apparatus is required. Therefore, after recording on the recording surface of a certain optical disc with an optical disc recording apparatus, the following complicated operation must be performed: the optical disc is taken out of the optical disc recording apparatus and a label sheet that has been subjected to printing with a separate printer is attached to the side opposite the recording surface. It has also been proposed that an optical disc having a thermally sensitive surface formed on one side be set on an optical disc recording apparatus and illuminated with laser on the thermally sensitive surface so that the latter changes color to form a visible image. However, the method proposed to date has been unable to form a multi-colored visible image on the basis of color image data and the like.

SUMMARY OF THE INVENTION

The present invention has been accomplished under these circumstances and aims at providing a disc that can form a multi-colored visible image using an optical disc apparatus without providing any separate assembly such as a new apparatus, as well as an optical disc apparatus and an image forming method that can form a multi-colored visible image on the disc.

In order to solve the aforesaid object, the invention is characterized by having the following arrangement.

(1) A disc having substantially the same shape as one that complies with a given specification of optical discs, comprising:
a disc-shaped substrate layer; and
a color forming layer placed on one side of the substrate layer and capable of forming a plurality of colors upon illumination with laser.

(2) The disc according to (1), wherein the color forming layer forms different colors upon illumination with the lasers of different characteristics.

(3) The disc according to (2), wherein the color forming layer includes a plurality of color forming sub-layers which respectively form different colors upon illumination with the lasers which respectively have different characteristics.

(4) The disc according to (3), wherein the plurality of color forming sub-layers comprise sub-layers which form three colors including red, green and blue, or three colors including cyan, magenta and yellow.

(5) The disc according to (3), wherein the plurality of color forming sub-layers undergo fixing upon illumination with light beams which respectively have different characteristics.

(6) The disc according to (1), wherein in the color forming layer, annular multi-color forming portions including annular color forming portions that form a plurality of different colors are provided in a plurality of circles concentric with the disc.

(7) The disc according to (6), further comprising pre-grooves that are provided in a plurality of circles on the one side of the substrate layer that are concentric with the disc in correspondence to the multi-color forming portions.

(8) The disc according to (6), wherein the plurality of color forming sub-layers comprise sub-layers which form three colors including red, green and blue, or three colors including cyan, magenta and yellow.

(9) The disc according to (1), wherein
in the color forming layer, color forming portions that form a plurality of different colors are respectively provided in spiral paths.

(10) The disc according to (9) further comprising pre-grooves that are provided in spiral paths on the one side of the substrate layer in correspondence to the color forming portions.

(11) The disc according to (9), wherein the plurality of color forming sub-layers comprise sub-layers which form three colors including red, green and blue, or three colors including cyan, magenta and yellow.

(12) The disc according to (1), wherein
in the color forming layer, annular color forming portions having predetermined widths are provided in a plurality of circles concentric with the disc, and color forming regions that form a plurality of different colors are provided in a circumferential direction thereof.

(13) The disc according to (12), wherein identification regions for identifying which of the color forming regions is intended to form which color is formed on the one side of the substrate layer.

(14) The disc according to (1), wherein in the color forming layer, color forming portions having predetermined widths are provided in spiral paths, and color forming regions that form a plurality of different colors are provided in a circumferential direction thereof.

(15) The disc according to (14), wherein identification regions for identifying which of the color forming regions is intended to form which color is formed on the one side of the substrate layer.

(16) The disc according to (1) further comprising:
a recording layer in compliance with the specification which is placed on the other side of the substrate layer opposed to the side where the plurality of color forming sub-layers are placed, data being written or rewritable to the recording layer.

(17) A method of forming an image by using an optical disc apparatus of a type that illuminates a set-up disc according to (1) with laser to form a color visible image, the method comprising the step of:

a multi-color forming step of illuminating the color forming layer with laser to form color on the basis of color image data.

(18) The method according to (17), wherein in case of setting the disc according to (2) on the optical disc apparatus, the color image data include image information at each of the coordinates on the disc for each of the colors that can be formed by the color forming layer, as a single-color forming process, on the basis of the image information at each of the coordinates for a single color, laser having a characteristic that enables the color forming layer to form the color is applied to allow the color forming layer to form color, and in the multi-color forming step, the single-color forming process is implemented for all of the colors that can be formed by the color forming layer.

(19) The method according to (18), wherein in case of setting the disc according to (5) on the optical disc apparatus, further comprising:

a fixing step of applying a light having a characteristic that enables fixing of the color formed by the color forming sub-layer to the color forming sub-layer.

(20) The method according to (19), wherein after the single-color forming process has ended for each of the color forming sub-layers other than the last color forming sub-layer in the multi-color forming process, the light having the characteristic that enables fixing is applied to the color forming sub-layer before starting the application of laser to the next color forming sub-layer.

(21) The method according to (21), wherein in case of setting the disc according to (6) on the optical disc apparatus, the color image data include image information at each of the coordinates belonging to positions on the disc along the multi-color forming portions for each of the colors of the color forming portions of the multi-color forming portions, as a single-color forming process, on the basis of image information at each of the coordinates for a single color, the color forming portion forming said color is illuminated with the laser to form said color, and in the multi-color forming step, the single-color forming process is implemented for all of the multi-color forming portions in the color forming layer.

(22) The method according to (17), wherein in case of setting the disc according to (9) on the optical disc apparatus, the color image data include image information at each of the coordinates belonging to positions on the disc along the color forming portions for each of the colors of the plurality of the color forming portions of the disc, as a single-color forming process, on the basis of the image information at each of the coordinates for a single color, the color forming portion that forms the color is illuminated with the laser to form said color, and in the multi-color forming step, the single-color forming process is implemented for all of the color forming portions in the multi-color forming portion, the multi-color forming step is implemented for all of the multi-color forming portions in the color forming layer.

(23) The method according to (17), wherein in case of setting the disc according to (12) on the optical disc apparatus, the color image data includes image information at each of the coordinates corresponding to positions on the disc along the annular color forming portions, a region corresponding to each of the coordinates in the color forming portions is illuminated with the laser associated with the image information at the coordinate so as to allow the color forming portion to form color, and the image information at each coordinate in the color image data is image information for realizing the formation of the color which is to be formed by the color forming region located at the position on the disc in correspondence to each coordinate.

(24) The method according to claim (17), wherein in case of setting the disc according to (14) on the optical disc apparatus, the color image data includes image information at each of the coordinates corresponding to positions on the disc along the spiral color forming portions, a region corresponding to each of the coordinates in the color forming portions is illuminated with the laser associated with the image information at the coordinate so as to allow the color forming portion to form color, and the image information at each coordinate in the color image data is image information for realizing the formation of the color which is to be formed by the color forming region located at the position on the disc in correspondence to each coordinate.

(25) An optical disc apparatus which illuminates the recording surface of an optical disc with laser to perform at least one of information writing and information reading, the optical disc apparatus comprising:

an optical pickup for applying laser to a disc set up on the apparatus; and an illumination control unit which, in response to an instruction for performing image formation on the disc according to (1), controls the optical pickup to illuminate the color forming layer with the laser to form color on the basis of color image data.

(26) The optical disc apparatus according to (25) wherein in case of setting the disc according to (2) on the optical disc apparatus, the color image data includes image information at each of the coordinates on the disc for each of the colors that can be formed by the color forming layer, the illumination control unit performs a single color forming control in which the laser having a characteristic that enables the color forming layer to form the color is applied to allow the color forming layer to form color, and the illumination control unit performs a multicolor forming control in which the single color forming control is implemented for all of the colors that can be formed by the color forming layer.

(27) The optical disc apparatus according to (26) further comprising the fixation unit which applies a light having a characteristic that enables fixing of the color formed by the color forming sub-layer to the color forming sub-layer in case of setting the disc according to (5) on the optical disc apparatus.

(28) The optical disc apparatus according to (27), wherein after the single-color forming control has ended for each of the color forming sub-layers other than the last color forming sub-layer in the multi-color forming process, the light having the characteristic that enables fixing is applied to the color forming sub-layer before starting the application of laser to the next color forming sub-layer.

(29) The optical disc apparatus according to (25), wherein in case of setting the disc according to (6) on the optical disc apparatus, the color image data includes image information at each of the coordinates belonging to positions on the disc along the multi-color forming portions for each of the colors of the color forming portions in the multi-color forming portions of the disc, the illumination control unit performs a single-color formation control in which on the basis of image information at each of the coordinates for a single color, the color forming portion that forms the color is illuminated with the laser to form the said color, the illumination control unit performs a multi-color formation control in which the single-color formation control is implemented for all of the color forming portions in the multi-color forming portion, and the multi-color forming control is implemented for all of the multi-color forming portions in the color forming layer.

(30) The optical disc apparatus according to (25) wherein in case of setting the disc according to (9) on the optical disc apparatus, the color image data includes image information which is at each of the coordinates corresponding to positions on the disc along the annular color forming portions and which is for realizing the formation of the color which is to be formed by the color forming region located at the position on the disc in correspondence to each coordinate, the illumination control unit controls the optical pickup to illuminate the region corresponding to each coordinate in the color forming portion with laser in association with the image information at the coordinate so as to allow the color forming portion to form color.

(31) The optical disc apparatus according to (25) wherein in case of setting the disc according to (12) on the optical disc apparatus, the color image data includes image information which is at each of the coordinates corresponding to positions on said disc along said spiral color forming portions and which is for realizing the formation of the color which is to be formed by said color forming region located at the position on said disc in correspondence to each coordinate, the illumination control unit controls the optical pickup to illuminate a region corresponding to each coordinate in the color forming portion with the laser in association wit the image information at the coordinate so as to allow the color forming portion to form color.

(32) The optical disc apparatus according to (25), wherein in case of setting the disc according to (14) on the optical disc apparatus, the color image data includes image information at each of the coordinates belonging to positions on the disc along the color forming portions for each of the colors of the plurality of the color forming portions of the disc, the illumination control unit performs a single-color forming control in which on the basis of the image information at each of the coordinates for a single color, the color forming portion that forms the color is illuminated with the laser to form the color, and the single-color forming control is implemented for all of the color forming portions.

(33) The optical disc apparatus according to (25) further comprising:

a rotating unit for driving and rotating the disc to be illuminated with the laser;

a radial drive unit for moving the optical pickup in a radial direction of the set-up disc; and a moving unit for moving the position in which the optical pickup applies laser to the set-up disc, wherein the illumination control unit controls, on the basis of the image information in association with one of the coordinates, the laser applied from the optical pickup each time the position of illumination with the laser from the optical pickup is moved by a predetermined amount by the moving unit.

BRIEF DESCRIPTION OF THE DRAWINGS

FIG. 1 is a perspective view showing the exterior appearance of the disc used in the image forming method according to the first embodiment of the invention;

FIG. 2 is a sectional view showing the construction of the disc schematically;

FIG. 18 is a sectional view showing schematically the construction of the disc used in the image forming method according to the second embodiment of the invention;

FIG. 25 is a sectional view showing schematically the construction of the disc used in the image forming method according to the third embodiment of the invention;

DETAILED DESCRIPTION OF PREFERRED EMBODIMENTS

Figure 3:
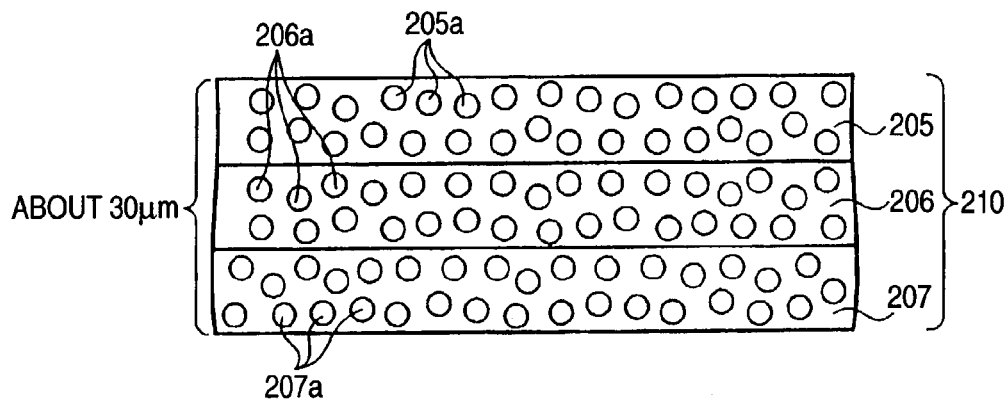
FIG. 3 is a sectional view showing schematically the construction of the color forming layer in the disc.

Embodiments of the invention are described below with reference to the accompanying drawings.

A. First Embodiment

The image forming method according to the first embodiment of the invention is one by which an image formed by multiple colors, namely, a color image can be formed on the label surface of an optical disc using an optical disc record/reproduce apparatus which can record music and various other kinds of data on the optical disc by illuminating it with laser. To begin with, the constructions of the optical disc and the optical disc record/reproduce apparatus that are used to implement this method are individually described below.

A-1. Construction of the Optical Disc

As shown in FIG. 1, the optical disc D used in the image forming method according to the first embodiment has substantially the same outer shape and dimensions as the optical discs such as the CD specified in the Red Book, as well as the CD-R and CD-RW specified in the Orange Book; it has a circular hole 1 in the center that enables it to be chucked with the optical disc record/reproduce apparatus during recording and reproducing. When we say the optical disc D has substantially the same dimensions as discs according to the above-mentioned specifications, we mean its dimensions are within such a range that the disc can be rotated or otherwise handled in a similar manner to the optical discs in compliance with those specifications by means of conventional common optical disc apparatuses such as CD-ROM drive and CD-R drive assemblies.

The optical disc D according to the first embodiment is one that is capable of recording music data, program data, etc. on one surface (the surface on the upper side of FIG. 1 which is hereunder referred to as the recording surface) as in the case of CD-R and which can form a color visible image on the other surface (the surface on the lower side of FIG. 1 which is hereunder referred to as the image surface). A schematic cross section of the optical disc D is shown in FIG. 2. As shown in FIG. 2, the optical disc D has a protective layer 201, a recording layer 202, a reflective layer 203, a protective layer 204, a color forming layer 210 consisting of three sub-layers in superposition, i.e., a blue color forming sub-layer 205, a green color forming sub-layer 206 and a red color forming sub-layer 207, and a protective layer 208. These layers are superposed in the order written, the protective layer 201 being the first on the recording surface side. FIG. 2 is no more than a schematic representation of the construction of the optical disc D and the relative dimensions and the like of the respective layers are not exactly the same as shown.

The recording layer 202 has a spiral groove (guide groove) 202a formed in the surface; when data is written to the optical disc D or the written data is read from it, the optical disc record/reproduce apparatus will apply laser along this groove 202a. Therefore, when data is to be recorded, the optical disc D is set up in such a way that the recording surface faces the optical pickup in the optical disc record/reproduce apparatus and data is recorded by controlling the laser from the optical pickup in association with the data to be recorded as it is moved along the groove 202a. On the other hand, when a color visible image is to be formed on its image surface, the optical disc D is set up in such a way that the image surface faces the optical pickup in the disc record/reproduce apparatus. Then, the color forming layer 210 consisting of the blue color forming sub-layer 205, the green color forming sub-layer 206 and the red color forming sub-layer 207 is illuminated with the laser from the optical pickup in the optical disc record/reproduce apparatus to be described later, whereby those color forming sub-layers of the color forming layer 210 are allowed to form appropriate colors that produce a color visible image in association with color image data. Thus, the optical disc D has substantially the same construction as the conventional CD-R except that it additionally has the blue, green and red color forming sub-layers 205, 206 and 207 and structural details of the recording layer 202, etc. will not be described.

As described above, the color forming layer 210 has the blue, green and red color forming sub-layers 205, 206 and 207, which can respectively form three primary colors due to the heat generated upon illumination with laser.

As shown schematically in FIG. 3, the color forming layer 210 has a thickness of about 30 μm; capsules 205a, 206a and 207a each having a diameter of about 1 μm are dispersed in large numbers in the blue, green and red color forming sub-layers 205, 206 and 207, respectively, and color formers are confined in these capsules. In the embodiment under consideration, diazonium salt compounds are used as the color formers to be confined in the capsules 205a, 206a and 207a; when heat is applied to the respective color forming sub-layers, the capsules open up releasing the confined color formers which react with the color developers in the respective color forming sub-layers to form the respective colors.

Figure 4:
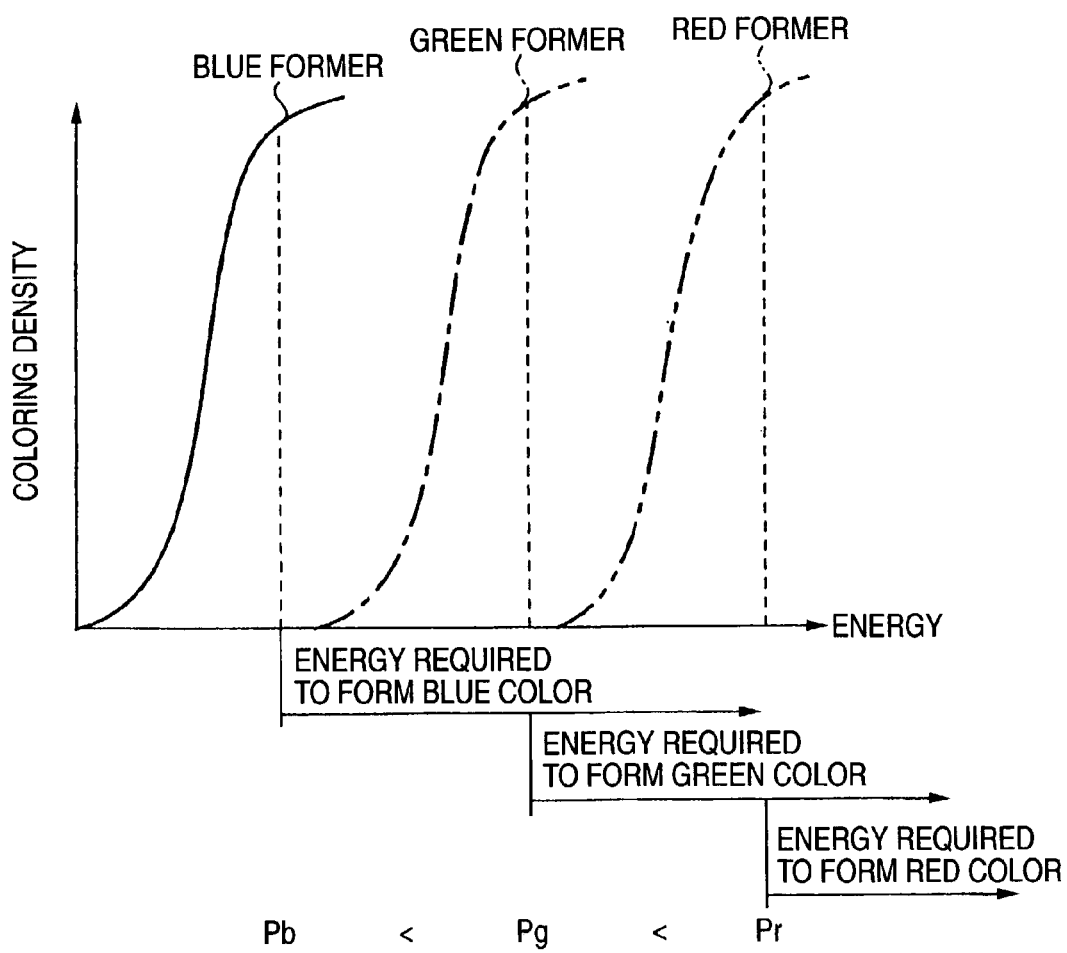
FIG. 4 is a graph showing the coloring densities of color formers contained in the blue, green and red color forming sub-layers in the color forming layer as they relate to the amount of energy required to achieve coloring.

As shown in FIG. 4, the color formers confined in the capsules 205a, 206a and 207a contained in the respective color forming sub-layers have different energy bands for the sensitivity of color formation. Specifically, the blue color former forms color even if it is given a small amount of energy whereas the red color former forms color only when a large amount of energy is applied, with the green color former forming color when it is given an intermediate amount of energy.

The blue, green and red color formers are also designed to decompose upon illumination with different wavelengths of ultraviolet radiation, so that after the blue and green color forming sub-layers 205 and 206 have formed colors upon application of specified amounts of energy as described above, they are illuminated with the corresponding wavelengths of ultraviolet radiation to fix the state where the respective colors have formed (including the uncolored portions).

In the embodiment under consideration, the optical disc D is of such a construction that the capsules 205a, 206a and 207a which form different colors are contained in the different color forming sub-layers 205, 206 and 207. If desired, the three types of capsules 205a, 206a and 207a may be contained in a single color forming sub-layer so that it can form a plurality of colors depending upon the amount of energy applied. As in the case of the optical disc D, the respective color forming sub-layers may be of such a type that they undergo fixation upon illumination with different wavelengths of ultraviolet radiation.

Described above is the construction of the optical disc D used in the image forming method according to the first embodiment of the invention.

A-2. Construction of the Optical Disc Record/Reproduce Apparatus

Figure 5:
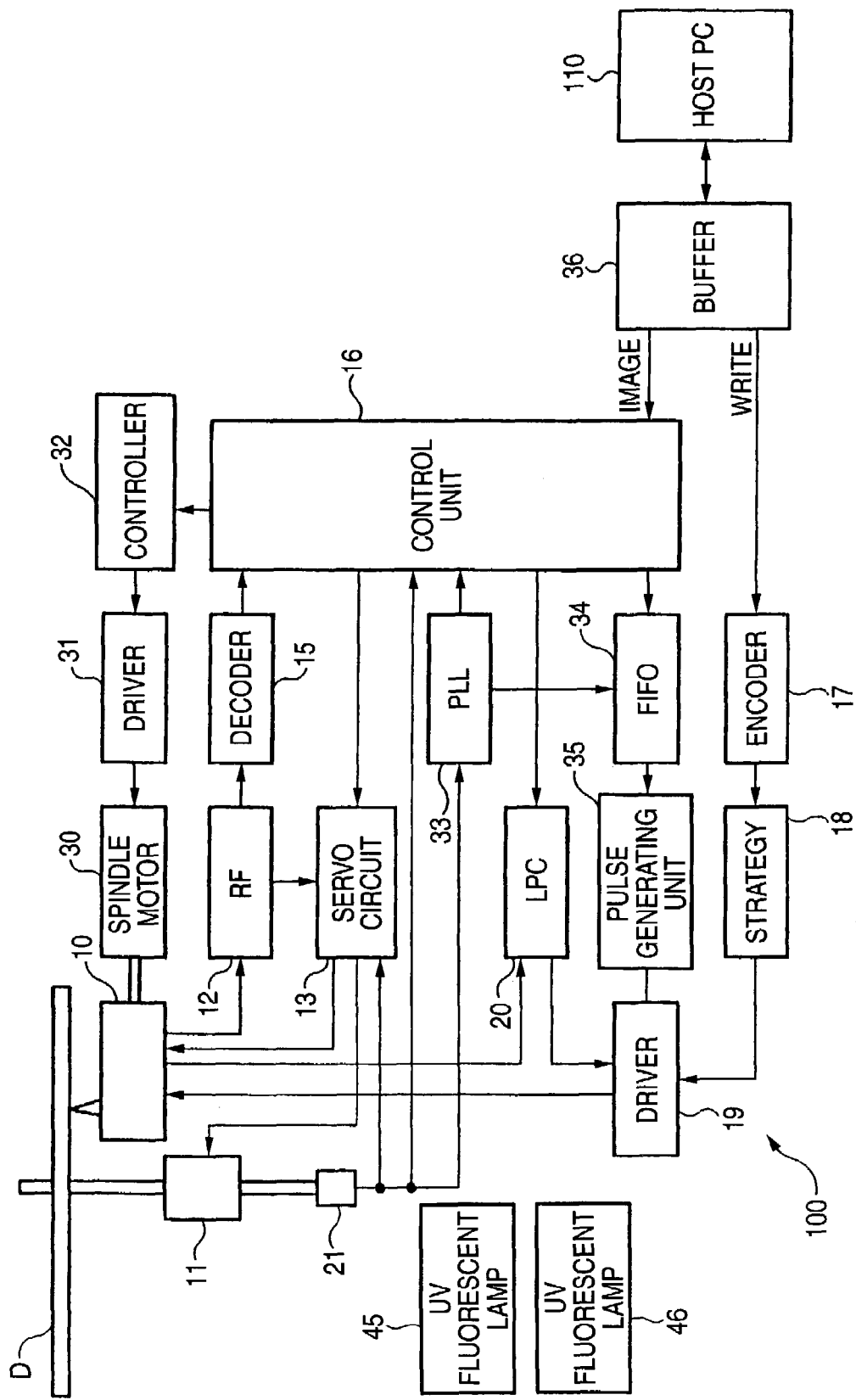
FIG. 5 is a block diagram showing the construction of the optical disc record/reproduce apparatus used in the image forming method according to the first embodiment of the invention.

We next describe the construction of the optical disc record/reproduce apparatus which can form a color image on the optical disc D of the above-described construction by illuminating its image surface with laser. As shown in FIG. 5, the optical disc record/reproduce apparatus generally indicated by 100 is connected to a host personal computer (PC) 110 and has the following components: an optical pickup 10, a spindle motor 11, a RF (radio frequency) amplifier 12, a servo circuit 13, a decoder 15, a control unit (illumination control means and fixing unit) 16, an encoder 17, a strategy circuit 18, a laser driver 19, a laser power control circuit 20, a frequency generator 21, a stepping motor 30, a motor driver 31, a motor controller 32, a PLL (phase-locked loop) circuit 33, FIFO (first-in first-out) memory 34, a drive pulse generating unit 35, a buffer memory 36, an ultraviolet fluorescent lamp (fixing unit) 45, and an ultraviolet fluorescent lamp (fixing unit) 46.

The spindle motor 11 is a motor by which the optical disc D to which data is to be written is driven to rotate and the number of its revolutions is controlled by the servo circuit 13. The optical disc record/reproduce apparatus 100 in the embodiment under consideration is designed to record and otherwise operate by the CAV (constant angular velocity) system, so the spindle motor 11 is adapted to rotate at a constant angular velocity that has been set in response to an instruction from the control unit 16 or the like.

Figure 6:
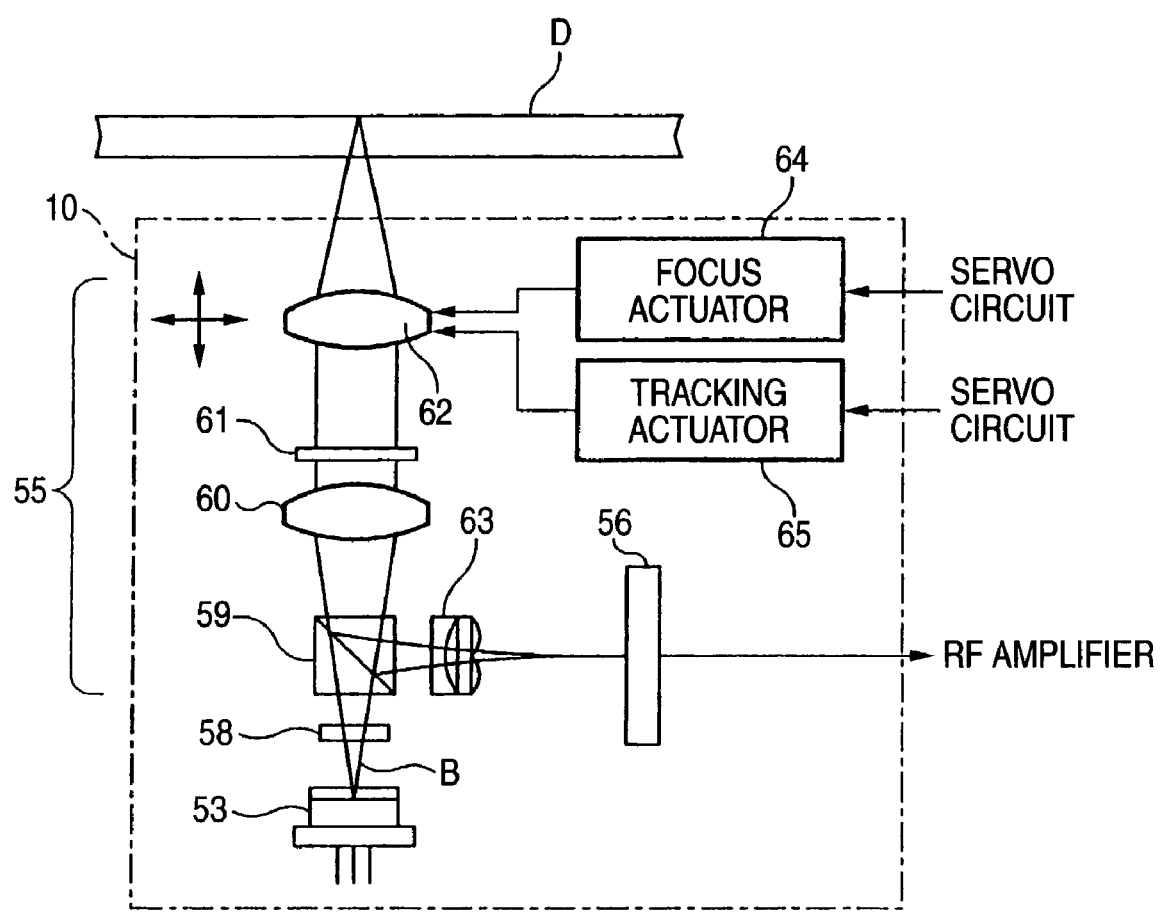
FIG. 6 is a diagram showing the construction of the optical pickup in the optical disc record/reproduce apparatus.

The optical pickup 10 is a unit for applying laser to the optical disc D as it is rotated by the spindle motor 11 and the construction of the optical pickup 10 is shown in FIG. 6. As shown in FIG. 6, the optical pickup 10 has a laser diode 53 which issues a laser B, a diffraction grating 58, optics 55 for allowing the laser B to converge on a surface of the optical disc D, and a beam-receiving device 56 for receiving the reflected beam.

In the optical pickup 10, the laser diode 53 is supplied with a drive current from the laser driver 19 (see FIG. 5) to issue a laser B of an intensity associated with the supplied drive current. The optical pickup 10 uses the diffraction grating 58 to divide the laser B from the laser diode 53 into three beamlets, main, leading and trailing ones. These three laserlets are passed through a polarizing beam splitter 59, a collimator lens 60, a λ/4 plate 61 and an objective lens 62 so that they are allowed to converge on a surface of the optical disc D. The three laserlets reflected by the surface of the optical disc D retrace the same optical path in the opposite direction (i.e. passing through the objective lens 62, the λ/4 plate 61 and the collimator lens 60) and are reflected by the polarizing beam splitter 59 so that they pass through a cylindrical lens 63 to be launched into the beam-receiving device 56. The beam-receiving device 56 outputs the received signal to the RF amplifier 12 (see FIG. 5) so that the signal for beam reception is supplied to the control unit 16 and the servo circuit 13 via the RF amplifier 12.

The objective lens 62 is held on a focus actuator 64 and a tracking actuator 65 such that it can move in the axial direction of the laser B and in the radial direction of the optical disc D. In response to a focus error signal and a tracking error signal supplied from the servo circuit 13 (see FIG. 5), the focus actuator 64 and the tracking actuator 65 move the objective lens 62 in the axial and radial directions, respectively. The servo circuit 13 generates a focus error signal and a tracking error signal on the basis of signals for beam reception that are supplied via the beam-receiving device 56 and the RF amplifier 12 and it performs focus control and tracking control by moving the objective lens 62 in the manner described above.

The optical pickup 10 has a front monitor diode (not shown) so that when the laser diode 53 issues laser, an electric current is generated in the front monitor diode as it receives the issued light, the current being supplied from the optical pickup 10 to the laser power control circuit 20 shown in FIG. 5.

The RF amplifier 12 amplifies an EFM (eight-to-fourteen modulation) modulated RF signal supplied from the optical pickup 10 and outputs the amplified RF signal to the servo circuit 13 and the decoder 15. During reproducing, the decoder 15 performs EFM demodulation of the EFM modulated RF signal from the RF amplifier 12 to generate reproduced data.

The servo circuit 13 is supplied with an instruction signal from the control unit 16, an FG pulse signal as supplied from the frequency generator 21 which has a frequency associated with the number of revolutions of the spindle motor 11 and a RF signal from the RF amplifier 12. On the basis of these signals supplied to it, the servo circuit 13 not only controls the rotation of the spindle motor 11 but also performs focus control and tracking control of the optical pickup 10. When information is written to the recording surface of the optical disc D (see FIG. 1) or a visible image is formed on the image surface of the optical disc D (also see FIG. 1), the spindle motor 11 may be driven by either the CAV (constant angular velocity) system in which the optical disc D is driven at a constant angular velocity or the CLV (constant linear velocity) system in which the optical disc D is driven to rotate at a constant linear recording velocity. The optical disc recording apparatus 100 according to the first embodiment of the invention adopts the CAV system and the servo circuit 13 drives the spindle motor 11 to rotate at a constant angular velocity as instructed by the control unit 16.

The buffer memory 36 stores the following two kinds of information being supplied from the host PC 110, i.e., the information to be written to the recording surface of the optical disc D (which is hereunder referred to as the write data) and the information associated with the visible image to be formed on the image surface of the optical disc D (which is hereunder referred to as the image data). The write data that has been stored in the buffer memory 36 is output to the encoder 17 whereas the image data is output to the control unit 16.

The encoder 17 performs EFM modulation of the write data as it is supplied from the buffer memory 36 and outputs the modulated data to the strategy circuit 18. The strategy circuit 18 performs time axis correction and other processing on the EFM signal supplied from the encoder 17 and outputs the result to the laser driver 19.

The laser driver 19 drives the laser diode 53 in the optical pickup 10 (see FIG. 6) in accordance with the signal being supplied from the strategy circuit 18 as modulated in association with the write data and under the control by the laser power control circuit 20.

The laser power control circuit 20 controls the power of the laser being issued from the laser diode 53 (see FIG. 6) in the optical pickup 10. Specifically, the laser power control circuit 20 controls the laser driver 19 such that laser of a value in agreement with an optimum target value of laser power as instructed by the control unit 16 is issued from the optical pickup 10. The control of laser power as performed by the laser power control circuit 20 is feedback control that uses the value of an electric current being supplied from the front monitor diode in the optical pickup 10 such that laser having the desired intensity is issued from the optical pickup 10.

Figure 7:
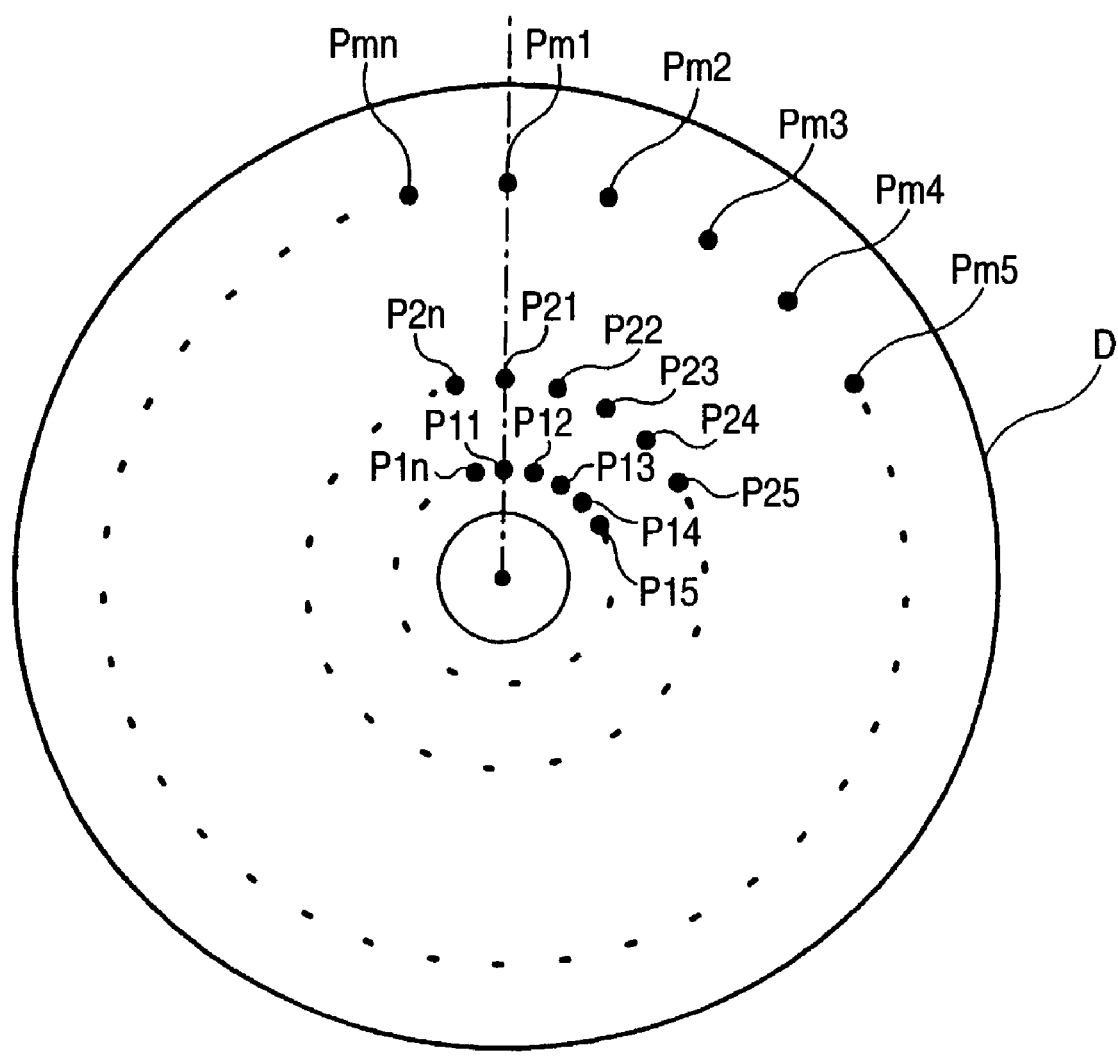
FIG. 7 is a diagram illustrating the content of color image data that is used by the optical disc record/reproduce apparatus to illuminate the disc with laser in the same image forming method.

The FIFO memory 34 is a site to which the image data supplied from the host PC 110 and stored in the buffer memory 36 is supplied via the control unit 16 for sequential storage. The image data to be stored in the FIFO memory 34, namely, the image data being supplied from the host PC 110 to the optical disc recording apparatus 100 under consideration contains the following information. This image data is for forming a visible image on a surface of the optical disc D and it describes image information which shows the color to be formed at each of the n coordinates (as indicated by dots in FIG. 7) on a large number of concentric circles around the center O of the optical disc D. FIG. 7 is a schematic representation that clearly shows the relative positions of the individual coordinates and the actual coordinates are arranged at smaller spacings than those depicted. If the host PC 110 uses the common bitmap format to construct image data that is to be formed on the light-sensitive surface of the optical disc D, the constructed bitmap data may be converted to data of the above-described polar coordinate format and the converted image data may be transmitted from the host PC 110 to the optical disc recording apparatus 100.

Figure 8:
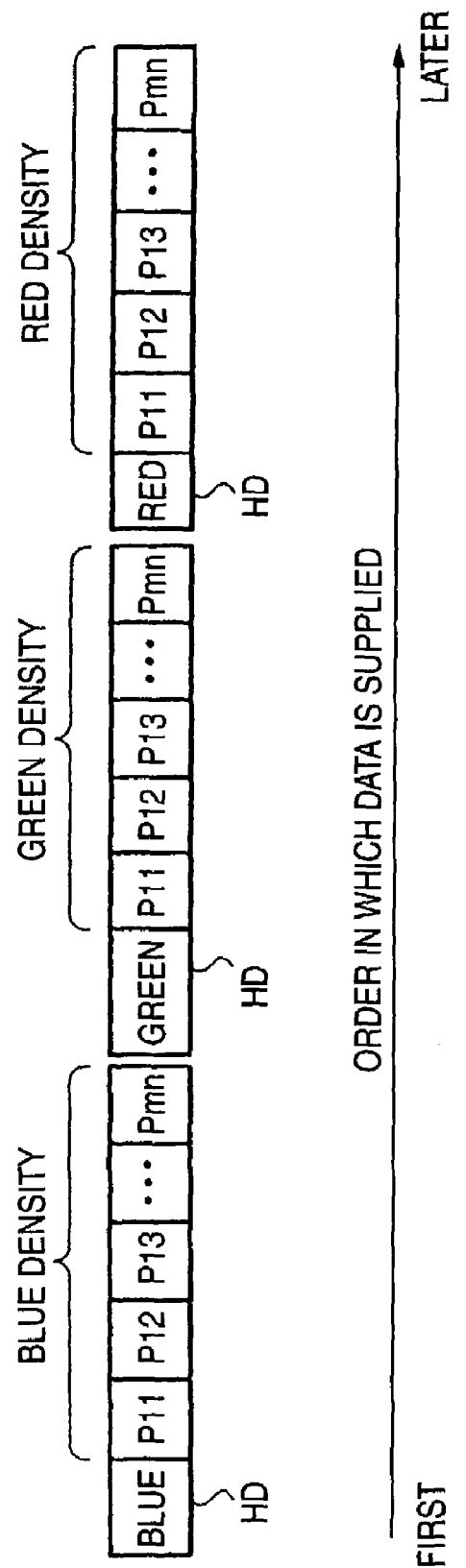
FIG. 8 is a diagram illustrating the order of transferring the color image data to the drive pulse generating unit in the optical disc record/reproduce apparatus.

More specifically, since a variety of colors can be represented by controlling the degree of formation of three primary colors, blue, green and red, the image data describes information that indicates the densities of blue, green and red at each coordinate in association with the color to be formed (such information is hereunder referred to as density-indicative information). The image data under consideration is color image data that describes the density-indicative information for each color at the respective coordinates that are arranged in such an order that a set of coordinates P1, P12, ... P1n belonging to the innermost circle are surrounded by a set of coordinates P21, P22, ... P2n belonging to the second innermost circle, which in turn are surrounded by a set of coordinates belonging to the third innermost circle until a coordinate Pmn on the outermost circle is reached; the FIFO memory 34 will be sequentially supplied with the color information for each color at the respective coordinates of the polar system. Stated more specifically, as shown in FIG. 8, information that indicates the density of blue color formation is supplied in the order of coordinates P11, P12, ... Pmn and, then, information that indicates the density of green color formation is supplied in the order of coordinates P11, P12, ... Pmn and, still thereafter, information that indicates the density of red color formation is supplied in the order of coordinates P11, P12, ... Pmn. The color image data under consideration has header information HD added at the head of the information indicative of the densities of each color at the respective coordinates in order to show which color is represented by the subsequently supplied data.

When a visible image is to be formed on the image surface of the optical disc D on the basis of the color image data which is supplied in the manner described above, the FIFO memory 34 is supplied with clock signals for image recording from the PLL circuit 33. The FIFO memory 34 is so adapted that each time clock pulses in the clock signal for image recording are supplied, color information that was the first to be stored and which is associated with one coordinate (i.e. color information for one color) will be output to the drive pulse generating unit 35.

Figure 9:
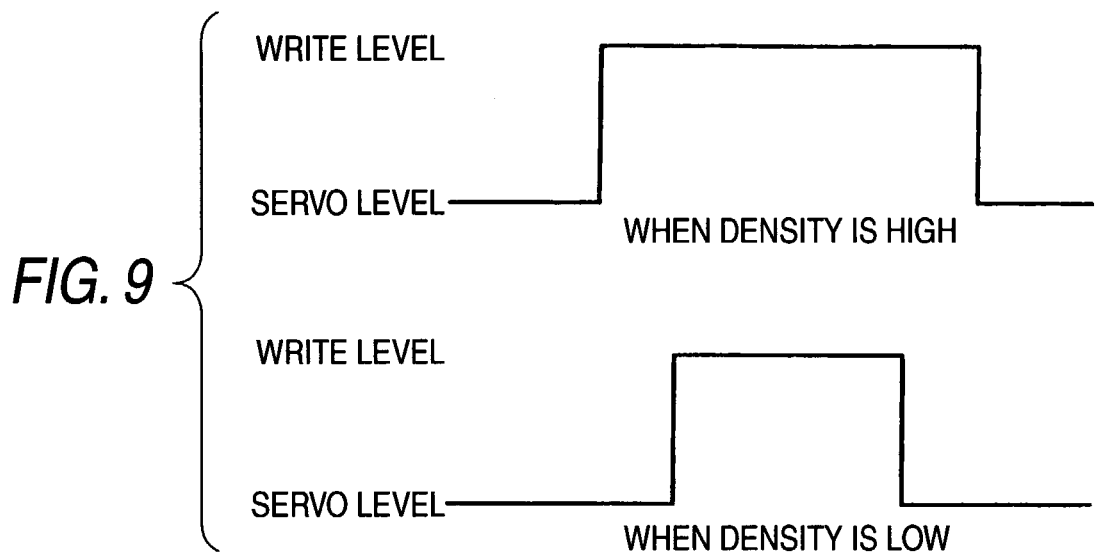
FIG. 9 illustrates the content of the control that is performed on the application of laser in order to represent the gradation of colors in a color image being formed on the disc by means of the optical disc record/reproduce apparatus.

The drive pulse generating unit 35 generates drive pulses that control the timing of illumination and other parameters of the laser being issued from the optical pickup 10. The drive pulses generated from the drive pulse generating unit 35 have a pulse width associated with the density-indicative information for each coordinate that is supplied from the FIFO memory 34. For instance, if the density-indicative information at a certain coordinate indicates a comparatively high density, drive pulses are generated that have a large pulse width at WRITE level as shown in the upper part of FIG. 9; on the other hand, in the case of a coordinate having a comparatively low density, drive pulses are generated that have a small pulse width at WRITE level as shown in the lower part of FIG. 9. The technique adopted in the embodiment under consideration is such that the densities of three primary colors to be formed, blue, green and red, are appropriately so adjusted as to have the viewer see an image that apparently consists of multiple colors; hence, among the regions on the optical disc D assigned to represent the image at one coordinate, the region where the respective colors are to be formed is determined in accordance with the color to be represented. Therefore, in order to form the desired color, the density-indicative information for each coordinate contains information about the size of the region where the desired color (either blue, green or red) is to be formed and the drive pulse generating unit 35 can generate pulse signals of a pulse width associated with such information.

The WRITE level referred to above is a power level at which the image surface (color forming layer 210) of the optical disc D undergoes a distinct color change when it is illuminated with laser power of that level; when drive pulses of the type described above are supplied to the laser driver 19, laser of the WRITE level will be issued from the optical pickup 10 for a period of time that corresponds to their pulse width. Hence, given large color information, laser of the WRITE level is applied for a longer time and a larger portion of a unit area on the image surface of the optical disc D changes color, causing the user and the like to recognize it as a high-density region. Thus, in the embodiment under consideration, the length of the portion of a unit area (unit length) which is to undergo color change is varied to represent the density to be indicated by the color image data.

The SERVO level is a power level at which the image surface of the optical disc D undergoes little color change when it is illuminated with laser power of that level. Regions that need not undergo color change may be illuminated with laser of the SERVO level rather than the WRITE level.

As already mentioned, the color forming layer 210 of the optical disc D has three color forming sub-layers, blue color forming sub-layer 205, green color forming sub-layer 206 and red color forming sub-layer 207, that have different levels of color formation (see FIG. 4) and the laser power for causing the respective color forming sub-layers to form colors is so varied that energy will be applied in the amounts required to cause the respective color forming sub-layers to form colors.

Figure 10:
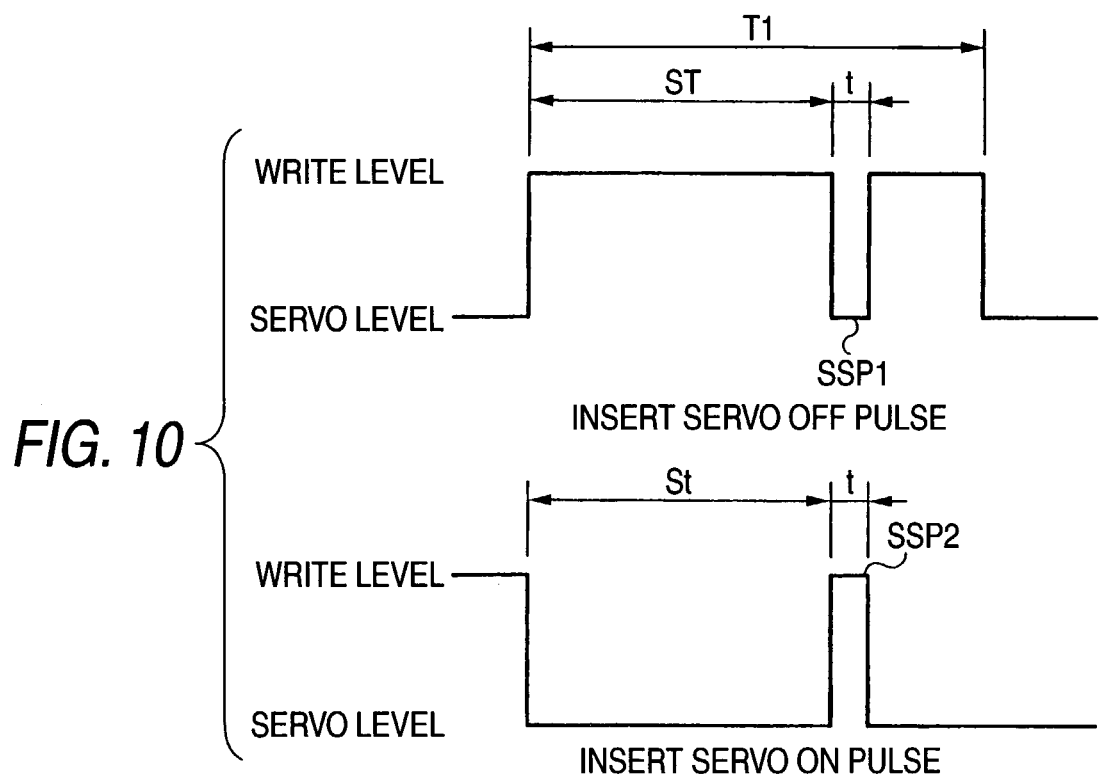
FIG. 10 illustrates how laser is controlled in order to form a color image on the disc by means of the optical disc record/reproduce apparatus.

In addition to generating drive pulses according to the above-described information indicating the gradient at each coordinate, the drive pulse generating unit 35, if required to perform laser power control by the laser power control circuit 20 as well as to perform focus control and tracking control by the servo circuit 13, inserts a WRITE level pulse of a very brief duration or a pulse of the SERVO level irrespective of the density indicated by color information. See, for example, the upper part of FIG. 10 which shows the case where in order to represent a visible image according to the density at a certain coordinate in the image data, it is necessary to apply laser of the WRITE level for a period of time T1 which is longer than a given servo period ST for laser power control; as shown, a servo OFF pulse of a very brief duration t (SSP1) is inserted at a time the servo period ST has passed since the generation of a WRITE level pulse. In the case shown in the lower part of FIG. 10 where it is necessary to apply laser of the SERVO level for a longer time than the servo period ST in order to represent a visible image according to the density at a certain coordinate in the image data, a servo ON pulse (SSP2) is inserted upon passage of the servo period ST since the generation of a SERVO level pulse.

Figure 11:
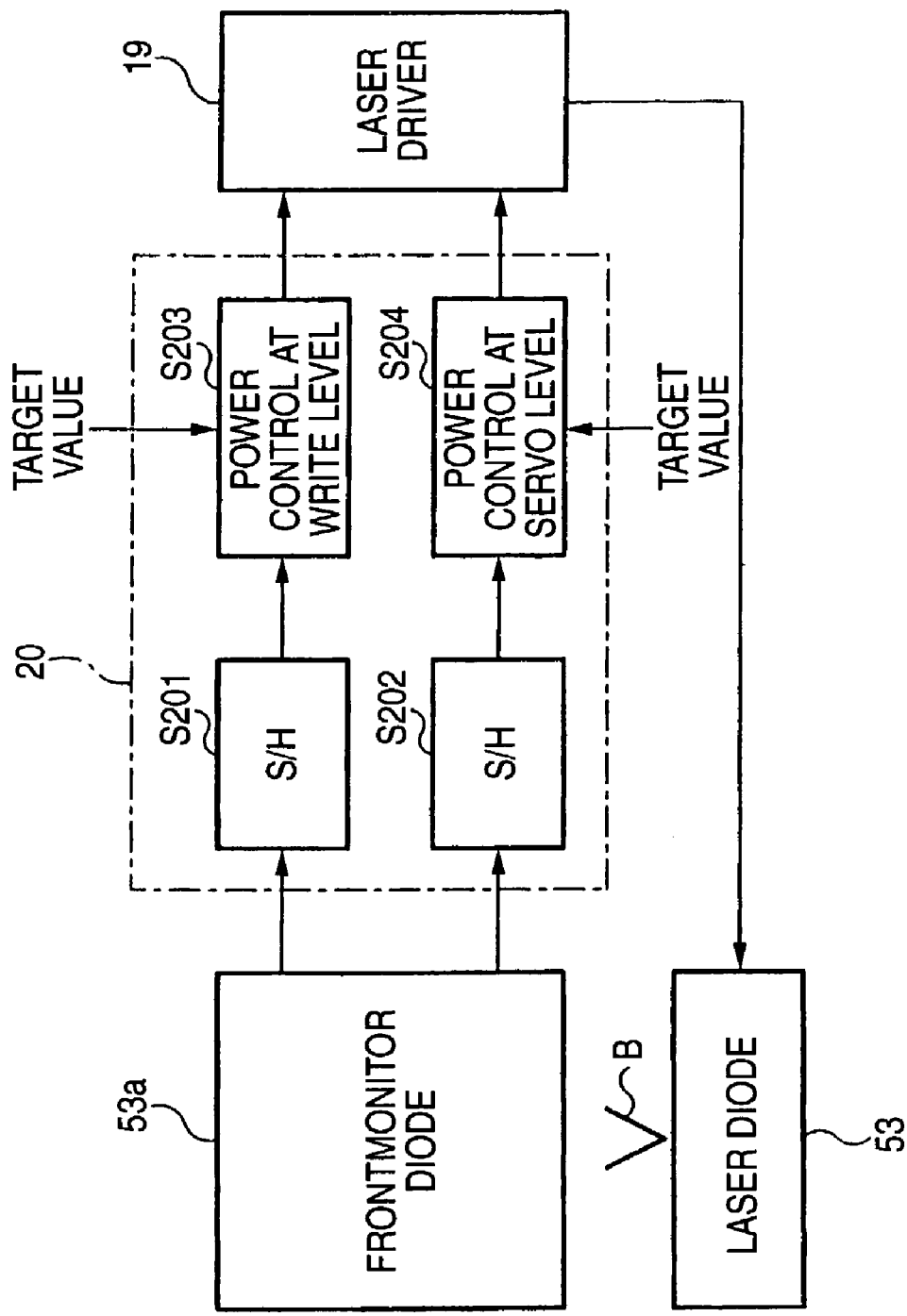
FIG. 11 illustrates the content of the control that is performed on laser power by a laser power control circuit which is a component of the optical disc record/reproduce apparatus.

As already mentioned, laser power control by the laser power control circuit 20 is performed on the basis of an electric current (of a value associated with the intensity of applied laser) that is supplied from the front monitor diode when it has received the laser issued from the laser diode 53 (see FIG. 5) in the optical pickup 10. More specifically, as shown in FIG. 11, the laser power control circuit 20 samples and holds a value associated with the intensity of the laser received by the front monitor diode 53a (S201, S202). Then, on the basis of the value that has been sampled and held when the WRITE level is the target value of illumination, namely, when a drive pulse of the WRITE level (see FIGS. 9 and 10) is being generated, the laser power control circuit 20 performs laser power control in such a way that the laser applied has the desired WRITE level as supplied from the control unit 16 (S203). Otherwise, on the basis of the value that has been sampled and held when the SERVO level is the target value of illumination, namely, when a drive pulse of the SERVO level (see FIGS. 9 and 10) is being generated, the laser power control circuit 20 performs laser power control in such a way that the laser applied has the desired SERVO level as supplied from the control unit 16 (S204).

Therefore, if no pulse of the WRITE or SERVO level is output for a continuous time longer than a given servo period ST (sampling period), the servo OFF pulse SSP1 or servo ON pulse SSP2 is forcibly inserted as described above irrespective of the content of the image data and laser power control can be accomplished for each of the WRITE and SERVO levels.

The servo circuit 13 is supplied with a control signal from the control unit 16, an FG pulse signal as supplied from the frequency generator 21 which has a frequency associated with the number of revolutions of the spindle motor 11 and an RF signal from the RF amplifier 12. On the basis of these signals it is supplied with, the servo circuit 13 controls the rotation of the spindle motor 11 and performs focus control and tracking control of the optical pickup 10. As already mentioned, when laser is applied to regions of low reflectance, the RF signal is not utilized in focus control. In addition, when a visible image is to be formed on the image surface of the optical disc D, there is no need to trace the position of illumination along the pre-groove (guide groove) and the like as in the case of writing information to the recording surface. Therefore, in the embodiment under consideration, a fixed value is adopted as the target for tracking control (a constant offset voltage is set for the tracking actuator).

In the embodiment under consideration, the CAT system is adopted to drive the spindle motor 11 when writing data to the recording surface of the optical disc D or when forming a color visible image on the image surface of the optical disc D, so the servo circuit 13 drives the spindle motor 11 to rotate at a constant angular velocity as instructed by the control unit 16.

The buffer memory 36 stores the following two kinds of information being supplied from the host PC 110, i.e., the information to be written to the recording surface of the optical disc D (which is hereunder referred to as the write data) and the information associated with the visible image to be formed on the image surface of the optical disc D (which is hereunder referred to as the image data). The write data that has been stored in the buffer memory 36 is output to the encoder 17 whereas the image data is output to the control unit 16.

The encoder 17 performs EFM modulation of the write data as it is supplied from the buffer memory 36 and outputs the modulated data to the strategy circuit 18. The strategy circuit 18 performs time axis correction and other processing on the EFM signal supplied from the encoder 17 and outputs the result to the laser driver 19.

The laser driver 19 drives the laser diode 53 in the optical pickup 10 (see FIG. 6) in accordance with the signal being supplied from the strategy circuit 18 as modulated in association with the write data and under the control by the laser power control circuit 20.

The laser power control circuit 20 controls the power of the laser being issued from the laser diode 53 (see FIG. 6) in the optical pickup 10.

Specifically, the laser power control circuit 20 controls the laser driver 19 such that laser of a value in agreement with an optimum target value of laser power as instructed by the control unit 16 is issued from the optical pickup 10. The control of laser power as performed by the laser power control circuit 20 is feedback control that uses the value of an electric current being supplied from the front monitor diode in the optical pickup 10 such that laser having the desired intensity is issued from the optical pickup 10.

The duration of time over which the servo OFF pulse SSP1 or the servo ON pulse SSP2 is inserted is preferably of a minimum value to an extent that will not be detrimental to the execution of laser power control and by making the insertion time very brief, the above-described servo operation can be performed while causing little effect on the visible image to be formed.

Figure 12:
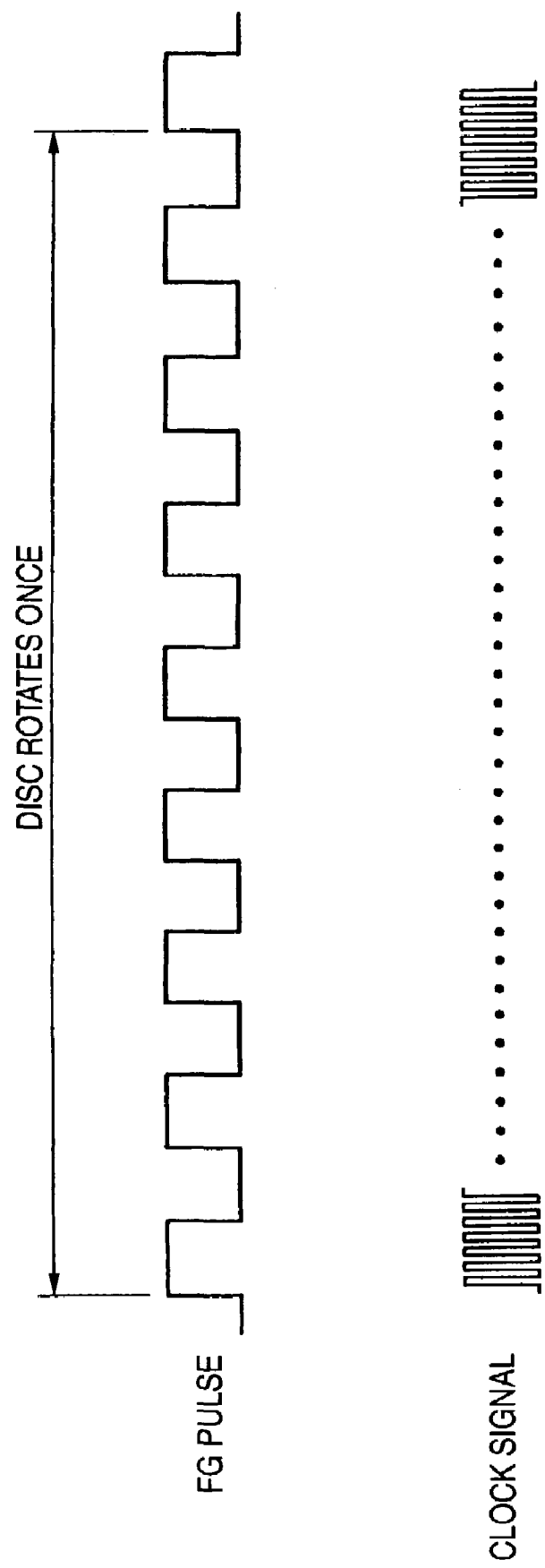
FIG. 12 shows FG pulses generated by a frequency generator which is a component of the optical disc record/reproduce apparatus in association with the amount of rotation of a spindle motor, as well as clock signals generated on the basis of those FG pulses.

Turning back to FIG. 5, the PLL circuit 33 multiples an FG pulse signal having a frequency associated with the rotating speed of the spindle motor 11 as it is supplied from the frequency generator 21 and the circuit outputs clock signals for use in the formation of a visible image as described later. The frequency generator 21 may typically use a Hall device to output an FG pulse signal having a frequency associated with the number of revolutions of the spindle. Consider, for example, the case shown in the upper part of FIG. 12 where the frequency generator 21 generates eight FG pulses as the spindle motor 11 makes a full turn, namely, as the optical disc D turns fully once; then, as shown in the lower part of FIG. 12., the PLL circuit 33 outputs clock signals comprising a multiple of said FG pulses, namely, clock signals having a frequency associated with the rotating speed of the optical disc D which is rotated with the spindle motor 11. In the embodiment under consideration, the FG pulses are multiplied to produce n clock signals which are as many as the coordinates on a single concentric circle in the above-described color image data (see FIG. 7). In this way, clock signals which are obtained by multiplying the FG pulse signals are output from the PLL circuit 33 to the FIFO memory 34 and at each period of such clock signals, namely, each time the position of illumination with laser moves by a constant amount as exemplified by the rotation of the disc D through a constant angle, data indicating the density at one coordinate is output from the FIFO memory 34 to the drive pulse generating unit 35. Instead of using the PLL circuit 33 to generate clock signals which are a multiple of the FG pulses, if the spindle motor 11 is one that is stable in its ability to drive the disc to rotate, the PLL circuit 33 may be replaced by a crystal oscillator which is used to generate the above-described clock signals which are a multiple of FG pulses, namely, clock signals having a frequency associated with the rotating speed of the optical disc D.

The stepping motor 30 is one for moving the optical pickup 10 radially over the optical disc D as it is set up on the apparatus under consideration. The motor driver 31 drives the stepping motor 30 to rotate by an amount associated with the pulse signals being supplied from the motor controller 32. In accordance with instructions given by the control unit 16 that include the direction and amount of radial movement of the optical pickup 10, the motor controller 32 generates pulse signals associated with the amount and direction of movement of the optical pickup 10 and outputs them to the motor driver 31. By means of the stepping motor 30 which causes the optical pickup 10 to move radially over the optical disc D and by means of the spindle motor 11 which rotates the optical disc D, the position at which the optical pickup 10 illuminates the optical disc D with laser can be moved variously across the optical disc D.

On the basis of instructions from the control unit 16, the ultraviolet fluorescent lamps 45 and 46 apply ultraviolet rays to the surface of the optical disc D which faces the optical pickup 10 as it is set up on the optical disc record/reproduce apparatus 100. In the embodiment under consideration, the ultraviolet fluorescent lamps 45 and 46 apply different wavelengths of ultraviolet radiation; the ultraviolet fluorescent lamp 45 applies ultraviolet radiation of a wavelength that fixes the color former contained in the blue color forming sub-layer 205 (see FIG. 3) whereas the ultraviolet fluorescent lamp 46 applies ultraviolet radiation of a wavelength that fixes the color former contained in the green color forming sub-layer 206 (see FIG. 3). The color former contained in the red color forming sub-layer 207 has such a characteristic that it is not fixed despite illumination with ultraviolet radiation of either of said two wavelengths; hence, the red color forming sub-layer 207 will not be affected in any way even if the image surface of the optical disc D is illuminated under the ultraviolet fluorescent lamp 45 or 46.

The control unit 16 is composed of a CPU (central processing unit), a ROM (read-only memory), a RAM (random-access memory), etc. and it is so designed that in accordance with the program stored in the ROM, it controls the individual components of the optical disc record/reproduce apparatus 100 to perform centralized control on the writing of information to the recording surface of the optical disc D and on the formation of an image on the image surface of the optical disc D.

Described above is the construction of the optical disc record/reproduce apparatus 100 according to the first embodiment of the invention.

A-3. Color Image Forming Method

We next describe a method of forming a color image on the image surface of the optical disc D of the construction described in A-1 using the optical disc record/reproduce apparatus 100 of the construction described in A-2, with the explanation being mostly directed to the operation of the optical disc record/reproduce apparatus 100.

Figure 13:
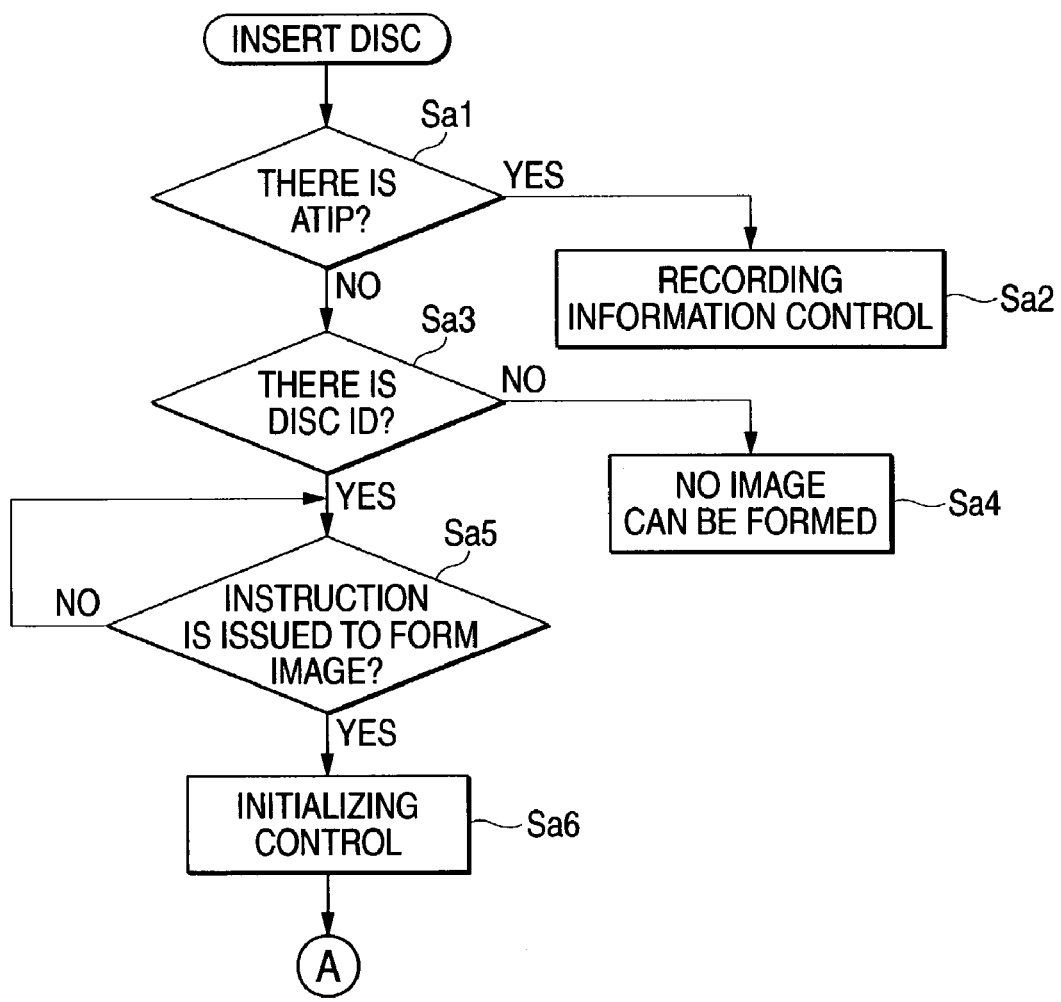
FIG. 13 is a flowchart illustrating the operation of the optical disc record/reproduce apparatus.
Figure 14:
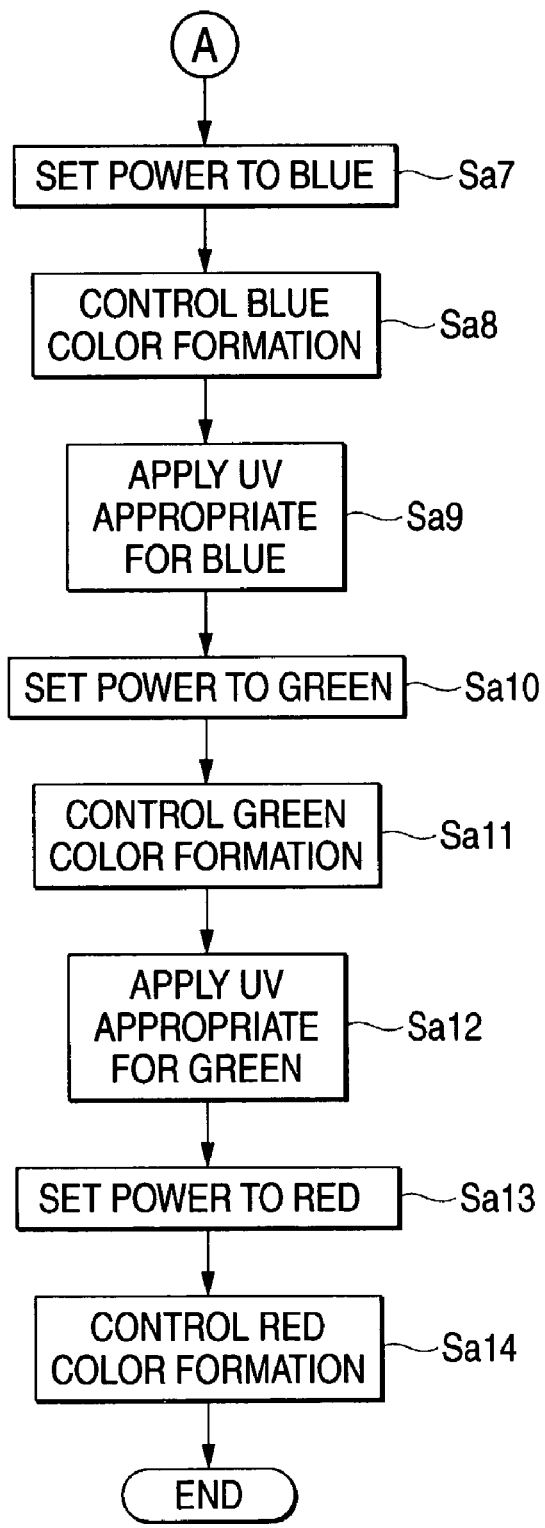
FIG. 14 is another flowchart illustrating the operation of the optical disc record/reproduce apparatus.

As FIGS. 13 and 14 show, when the optical disc D is set up on the optical disc record/reproduce apparatus 100, the control unit 16 controls the optical pickup 10 and other components and checks if ATIP (absolute time in pre-groove) information has been written to the surface of the set-up optical disc D which faces the optical pickup 10 (step Sa1). As is well known, ATIP information is preliminarily written to the pre-groove in the recording surface of CD-R and the recording of ATIP information in the manner just described above indicates that the optical disc D has been set up with the recording surface facing the optical pickup 10. If ATIP information has not been recorded, it is concluded that the optical disc D has been set up with the image surface facing the optical pickup 10. In other words, by detecting the presence of ATIP information in the manner described above, the control unit 16 determines which side of the optical disc D faces the optical pickup 10 as it is set up. Detecting the presence of ATIP information in the manner described above is not the only way to determine which side of the optical disc D faces the optical pickup 10 as it is set up and decision may be made by another method such as one involving the performance of focus servo and considering its result. To be specific, the distance between the optical pickup 10 and the side of the optical disc D which faces it varies considerably depending upon which side of the optical disc D faces the optical pickup 10 as it is set up, so the difference in this distance is reflected in the amount of control to be accomplished by focus servo and on the basis of this amount of control, it can be determined which side of the optical disc D faces the optical pickup 10 as it is set up. Another method is detecting data such as EFM signals written to the recording surface of the optical disc or combining the above-described methods to determine which side of the optical disc D faces the optical pickup 10 as it is set up.

If ATIP information has been detected from the set-up optical disc D, it is concluded that the optical disc D has been set up such that the recording surface faces the optical pickup 10 and the control unit 16 performs control to ensure that the write data as it is supplied from the host PC 110 is written to the recording surface of the optical disc D (step Sa2). The control to be performed here for writing the write data is the same as what is performed in the conventional optical disc record/reproduce apparatus (CD-R drive assembly) and, hence, need not be described.

Figure 15:
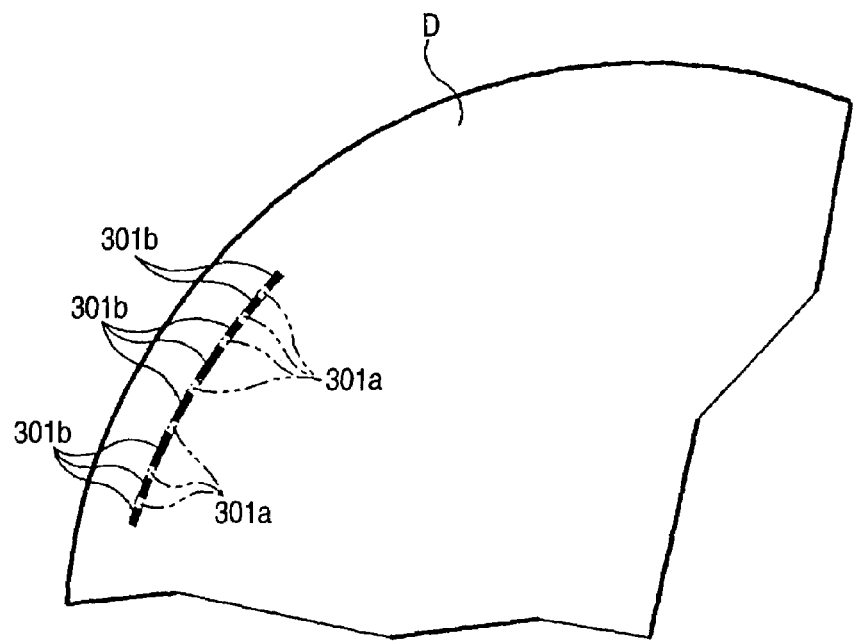
FIG. 15 is a diagram illustrating the disc ID formed in the image surface of the disc.

If ATIP information is not detected from the set-up optical disc D, it is concluded that the optical disc D has been set up such that the image surface faces the optical pickup 10 and the control unit 16 determines whether it can acquire the disc ID of the set-up optical disc D (step Sa3). In the embodiment under consideration, the disc ID of the optical disc D is one that has been written to the image surface of the optical disc D having both the recording surface and the image surface (see FIG. 2) and a typical example is illustrated in FIG. 15, where visible images corresponding to information in an encoded form of the disc ID are described on the circumference of the outermost circle on the image surface of the optical disc D. In the embodiment under consideration, reflective regions 301*a* and non-reflective regions 301*b* that have code-dependent lengths are formed on the circumference of the outermost circle to describe the disc ID on the image surface of the optical disc D. The control unit 16 traces the position of illumination with laser from the optical pickup 10 on the circumference of the outermost circle on the optical disc D, thereby acquiring the disc ID from the reflected light.

Therefore, if the reflective regions 301*a* and the non-reflective regions 301*b* that correspond to the disc IC are not formed on the circumference of the outermost circle on the image surface of the optical disc D, it may be concluded that the optical disc D of interest is a common optical disc having no image surface (e.g. CD-R). If, as in this case, disc ID cannot be acquired, the control unit 16 concludes that the optical disc D of interest is one that precludes the formation of a visible image (step Sa4) and performs the necessary processing such as notifying the user of that fact.

If the disc ID can be acquired from the optical disc D, the control unit 16 is on standby until the host PC 110 delivers an instruction for image formation including image data (step Sa5) and if such instruction is given, the control unit 16 performs initializing control for forming a visible image on the image surface of the optical disc D (step Sa6). More specifically, the control unit 16 controls the servo circuit 13 to ensure that the spindle motor 11 is rotated at a given angular velocity or drives the stepping motor 30 by supplying the motor controller 32 with an instruction for moving the optical pickup 10 to the initial position which is on the radially innermost circle of the optical disc D.

When initializing control is performed by the control unit 16, actual processing for forming a visible image on the image surface of the optical disc D will start. As FIG. 14 shows, when the header information HD is detected in the color image data supplied from the host PC 110 via the buffer memory 36 (the first supplied information is blue-indicative information), the control unit 16 first instructs the laser power control circuit 20 to set the desired value of laser power corresponding to blue color with a view to ensuring that the blue color forming sub-layer 205 indicated by the header information HD will form color in accordance with the image data (step Sa7).

As already mentioned, the color forming layer 210 of the optical disc D consists of three color forming sub-layers which contain color formers that must be given different amounts of energy to form colors. In addition, the optical disc record/reproduce apparatus 100 is so designed that laser is applied to achieve color formation from the respective color forming sub-layers in the increasing order of the amount of energy required to cause color formation, namely, from blue, green and red color forming sub-layers in that order, and the desired value of laser power is set in accordance with the color forming sub-layer which is caused to form color. Therefore, if the color identified by the header information HD is blue, the control unit 16 sets the desired value of laser power at Pb (see FIG. 4). If the intensity of the laser to be applied from the optical pickup 10 is set to this value, only the blue color forming sub-layer 205 will form color but the green color forming sub-layer 206 and the red color forming sub-layer 207 will not. Consequently, only the blue color forming sub-layer 205 is allowed to form color.

If laser power is set as described above in order to ensure that only the blue color forming sub-layer 205 will form color, the control unit 16 controls the respective components of the apparatus in order to realize color formation from the blue color forming sub-layer 205 on the basis of the color image data consisting of blue density information at each coordinate that follows the associated header information HD (step Sa9).

In this step of control, the control unit 16 first transfers to the FIFO memory 34 the density information at each coordinate that has been supplied following the blue-indicative header information HD. While a train of FG pulse signals are supplied from the frequency generator 21 as the optical disc D makes a full turn (see FIG. 12), the rise of either one of those pulses (the pulse that derives from those FG pulses and which is output when the optical disc D rotates fully once is hereunder referred to as a reference pulse) provides a trigger for the control unit 16 to control the respective components such that image data are sequentially output from the FIFO memory 34 in synchronism with clock signals being output from the PLL circuit 33 since the rise time of the reference pulse. As the result of this control, each time clock pulses are supplied from the PLL circuit 33, the FIFO memory 34 outputs information indicative of the density at one coordinate to the drive pulse generating unit 35, which then generates drive pulses of a width in accordance with the density indicated by said information and outputs said drive pulses to the laser driver 19. As a result, the optical pickup 10 illuminates the image surface of the optical disc D with laser of the WRITE level (power level Pb corresponding to blue color) for a time period that is associated with the density at each coordinate, whereby only the region in the blue color forming sub-layer 205 that has been illuminated with laser of the WRITE level will turn blue.

Thereafter, when a reference pulse is supplied from the frequency generator 21, or when the optical disc D rotates fully once after the issuance of laser was begun for color formation in the manner described above, the control unit 16 instructs the motor controller 32 to move the optical pickup 10 radially outward by a specified amount. In response to this instruction, the motor controller 32 drives the stepping motor 30 via the motor driver 31, whereby the optical pickup 10 is moved from the center outward by the specified amount. In other words, the position in the optical disc D which is illuminated with laser is moved from the center outward by the specified amount.

The amount by which the optical pickup 10 is moved radially across the optical disc D may be determined as appropriate for the spot diameter of the laser being applied from the optical pickup 10. Stated more specifically, if a visible image is to be formed on the image surface of the optical disc D, ensuring that the position of illumination with laser from the optical pickup 10 is moved across the optical disc D substantially leaving no blank spaces on the surface is necessary to realize the formation of a higher-definition image. Therefore, if the length of a unit movement of the optical pickup 10 in the above-described radial direction is made substantially equal to the spot diameter of the laser toward the optical disc D, the surface of the optical disc C can be illuminated with laser substantially leaving no blank spaces and a higher-definition image can be formed. Depending on the nature of the image surface and various other factors, it sometimes occurs that a region larger than the spot diameter of the applied beam will form color and in a case like this the width of that region may be taken into account in determining the amount of a unit movement such that there will be no overlap between adjacent regions of color formation.

When the position of illumination under the optical pickup 10 has been moved from the center outward in the manner described above, the control unit 16 again uses the reference pulse as a trigger and performs the same control as described above such that image data are sequentially output from the FIFO memory 34 in synchronism with clock signals being output from the PLL circuit 33. As a result of this control, the optical pickup 10 again illuminates the image surface of the optical disc D with laser of the WRITE level for a time period that is associated with the density at each coordinate, whereupon the illuminated region in the blue color forming sub-layer 205 will form color.

As described above, laser associated with the supplied color image data (for blue color) is applied as the position of illumination with laser from the optical pickup 10 is moved by a specified amount from the center outward each time the optical disc D makes a full turn and this operation is continued until the header information HD indicating green color is supplied. In other words, application of laser is continued until after the processing for color formation associated with the color image data for forming a blue color ends. When this processing ends, the control unit 16 causes the ultraviolet fluorescent lamp 45 to turn on for a specified period of time (step Sa9). As already mentioned, the ultraviolet fluorescent lamp 45 applies ultraviolet rays of a wavelength that can fix the color former contained in the blue color forming sub-layer 205 and by turning on this ultraviolet fluorescent lamp 45 so that the image surface of the optical disc d is illuminated with ultraviolet radiation, the colored state of the blue color forming sub-layer 205 (including the uncolored area) is fixed.

When the ultraviolet fluorescent lamp 45 has been turned on for a sufficient time that the blue color forming sub-layer 205 is fully fixed, said lamp is switched off, whereupon the control unit 16 instructs the laser power control circuit 20 to set the desired value of laser power corresponding to green color in order to ensure that the green color forming sub-layer 206 will form color in accordance with the image data (step Sa10). More specifically, the control unit 16 sets the desired value of laser power to Pg (see FIG. 4). If the intensity of the laser to be applied from the optical pickup 10 is set to this value, the red color forming sub-layer 207 will not form color and the blue color forming sub-layer 205, which has been fixed by the above-described illumination with ultraviolet radiation, will not form color upon illumination with laser having the power Pg.

Consequently, only the green color forming sub-layer 206 is allowed to form color.

Figure 17A:
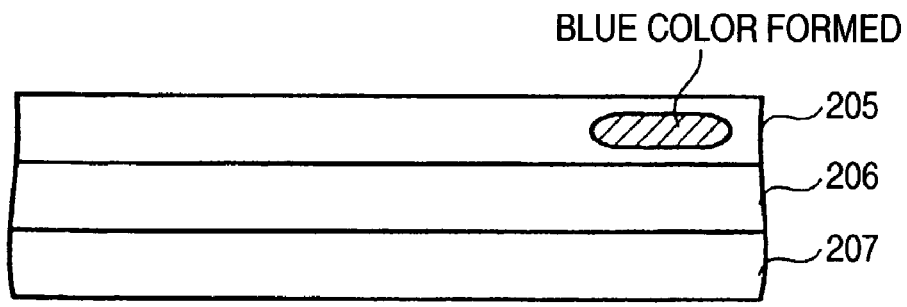
FIGS. 17A to 17C show schematically how the color forming sub-layers on the disc are allowed to form colors by means of the optical disc record/reproduce apparatus.
Figure 17B:
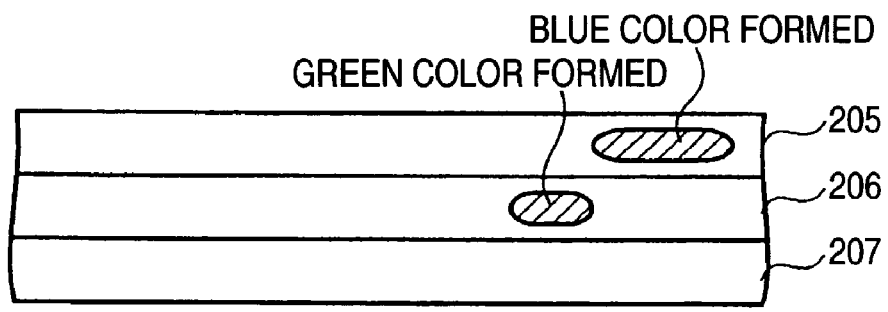

If laser power is set as described above in order to ensure that only the green color forming sub-layer 206 will form color, the control unit 16 controls the respective components of the apparatus in order to realize color formation from the green color forming sub-layer 206 on the basis of the color image data consisting of green density information at each coordinate that follows the associated header information HD (step Sa11). The process of control to be performed in this step for coloring is the same as the above-described control that was performed in step Sa8 to realize color formation from the blue color forming sub-layer 205; consequently, in addition to the blue color forming sub-layer 205 which has been fixed in the manner described above, the green color forming sub-layer 206 is also allowed to form color (see FIG. 17B).

When, after the supply of the header information HD indicating red color, the process of control for coloring on the basis of the color image data consisting of green density information at each coordinate ends, the control unit 16 causes the ultraviolet fluorescent lamp 46 to turn on for a specified period of time (step Sa12). As already mentioned, the ultraviolet fluorescent lamp 46 applies ultraviolet rays of a wavelength that can fix the color former contained in the green color forming sub-layer 206 and by turning on this ultraviolet fluorescent lamp 46 so that the image surface of the optical disc d is illuminated with ultraviolet radiation, the colored state of the green color forming sub-layer 206 (including the uncolored area) is fixed.

When the ultraviolet fluorescent lamp 46 has been turned on for a sufficient time that the green color forming sub-layer 206 is fully fixed, said lamp is switched off, whereupon the control unit 16 instructs the laser power control circuit 20 to set the desired value of laser power corresponding to red color in order to ensure that the red color forming sub-layer 207 will form color in accordance with the image data (step Sa13). More specifically, the control unit 16 sets the desired value of laser power to Pg (see FIG. 4). If the intensity of the laser to be applied from the optical pickup 10 is set to this value, the red color forming sub-layer 207 is allowed to form color. Since the blue color forming sub-layer 205 and the green color forming sub-layer 206 have been fixed by the above-described illumination with ultraviolet radiation, they will not form color upon illumination with laser having the power Pg.

Consequently, only the red color forming sub-layer 207 is allowed to form color.

Figure 17C:
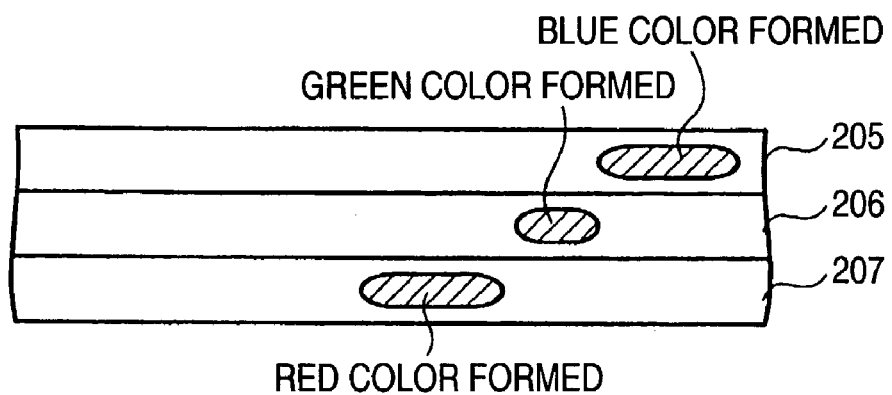

If laser power is set as described above in order to ensure that only the red color forming sub-layer 207 will form color, the control unit 16 controls the respective components of the apparatus in order to realize color formation from the red color forming sub-layer 207 on the basis of the color image data consisting of red density information at each coordinate that follows the associated header information HD (step Sa14). The process of control to be performed in this step for coloring is the same as the above-described control that was performed in step Sa8 to realize color formation from the blue color forming sub-layer 205; consequently, in addition to the blue color forming sub-layer 205 and the green color forming sub-layer 206 which have been fixed in the manner described above, the red color forming sub-layer 207 is also allowed to form color (see FIG. 17C). Thus, the three primary colors in the blue, green and red color forming sub-layers 205, 206 and 207 can be formed at appropriate densities for each coordinate and, consequently, the region of interest can be recognized by the viewer as presenting the desired color.

Described above are the principal operations of the optical disc record/reproduce apparatus 100 and according to the image forming method using this optical disc record/reproduce apparatus 100, there is no need to install additional printing means and the like and all components of the apparatus including the optical pickup 10 that are used to write information to the recording surface of the optical disc D are utilized to a maximum extent such that the image surface on the opposite side of the optical disc D is illuminated with laser to form a color visible image associated with the color image data.

Another feature of the optical disc record/reproduce apparatus 100 is that it controls the timing of application of laser on the basis of clock signals that are generated with the aid of FG pulses generated in association with the rotation of the spindle motor 11, namely, clock signals that are generated in association with the amount of revolution of the optical disc D. Given this feature, the optical disc record/reproduce apparatus 100 can recognize the position of illumination with laser without acquiring position and any other information from the optical disc D. Therefore, the optical disc record/reproduce apparatus 100 does not have to meet the requirement that it use an optical disc D that has been given some special treatment such as forming a pre-groove (guide groove) in the image surface and a color visible image associated with the image data can be formed on the image surface even if no groove, position information and the like are preliminarily provided.

A-4. Modifications of the First Embodiment

In the above-described first embodiment of the invention, a color image is formed on the optical disc D having the tricolor forming layer 210 which consists of the blue color forming sub-layer 205, the green color forming sub-layer 206 and the red color forming sub-layer 207. Alternatively, one may use an optical disc that has a YMC tricolor forming layer in place of the color forming layer 210, or an optical disc in which the color forming layer 210 has two color forming sub-layers. If desired, capsules that form three colors, yellow, magenta and cyan, may be incorporated in a single color forming sub-layer.

In the above-described first embodiment, the density of each color to be formed is controlled by adjusting the area of a color forming region that belongs to one coordinate in each of the three color forming sub-layers 205, 206 and 207. If color formers of such a characteristic that color density varies with the amount of energy applied are incorporated in the blue, green and red color forming sub-layers 205, 206 and 207, the density of each color's formation at each coordinate can also be controlled by applying laser of a density-associated intensity.

In the above-described first embodiment, the blue color forming sub-layer 205, the green color forming sub-layer 206 and the red color forming sub-layer 207 contain color formers that require different amounts of energy to form colors and the respective colors are individually formed by varying the power of laser that is applied to those color forming sub-layers. If desired, color formers of such a characteristic that they form colors upon illumination with laser characterized by a parameter other than power may be incorporated in the respective color forming sub-layers. For example, a design may be adopted such that color formers that require illumination with different wavelengths of light to form colors are incorporated in the respective color forming sub-layers and that in order to realize color formation from the respective color forming sub-layers, the optical disc record/reproduce apparatus 100 is activated to apply laser at corresponding wavelengths. In this case, a pickup that can apply laser at the wavelengths required to realize color formation by the color formers contained in the respective color forming sub-layers may be mounted in the optical disc record/reproduce apparatus 100. If this design is adopted, applying laser of a wavelength that is associated with a certain color forming sub-layer will hardly affect the other color forming sub-layers, so color image can be formed without involving the above-described process of applying ultraviolet radiation or any other steps for fixing colors.

B. Second Embodiment

We next describe the image forming method according to the second embodiment of the invention. The image forming method according to the second embodiment of the invention is the same as in the above-described first embodiment and can form an image formed of multiple colors, namely, a color image on the label surface of an optical disc using an optical disc record/reproduce apparatus. To begin with, the construction of the optical disc that is used to implement this method is described below.

B-1. Construction of the Optical Disc

Figure 19:
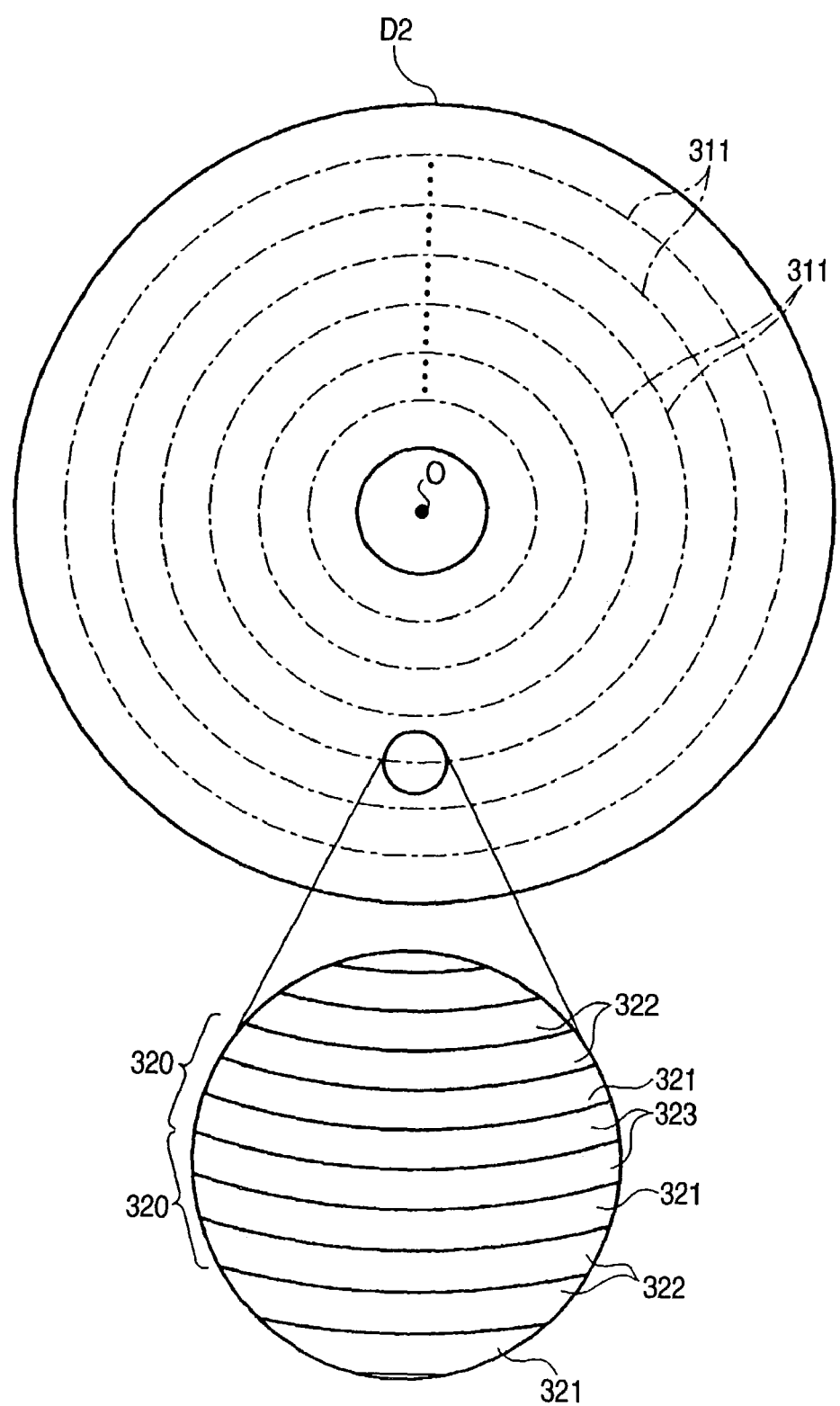
FIG. 19 shows the image surface of the disc for use in the second embodiment, as well as showing part of it enlarged.

The optical disc D2 used in the image forming method according to the second embodiment is the same as the optical disc D according to the first embodiment and it has substantially the same outer shape and dimensions as the optical discs such as the CD specified in the Red Book, as well as the CD-R and CD-RW specified in the Orange Book; the construction of the optical disc D2 is illustrated in FIGS. 18 and 19.

The optical disc D2 according to the second embodiment is the same as the optical disc D according to the above-described first embodiment in that it has a recording surface on one side (the surface on the upper side of FIG. 18) and an image surface on the other side (the surface on the lower side of FIG. 18). As shown in FIG. 18, the optical disc D2 has a similar construction to the optical disc D in that it has a protective layer 201, a recording layer 202 and a reflective layer 203, with a color forming layer 310 and a protective layer 208 lying under the reflective layer 203. FIG. 18 is no more than a schematic representation of the construction of the optical disc D2 and the relative dimensions and the like of the respective layers are not exactly the same as shown.

As seen from the image surface (the lower side of FIG. 18), the side of the reflective layer 203 facing the color forming layer 310 of the optical disc D2 has a large number of pre-grooves 311 formed in spaced concentric circles about the center O of the optical disc D2. The portion of the color forming layer 310 which corresponds to each pre-groove 311 is a green color forming portion 321 having substantially the same width as said pre-groove 311. Those portions of the color forming layer 310 which are on opposite sides of the green color forming portion 321 are a blue color forming sub-layer 322 and a red color forming portion 323. Thus, the radii of two adjacent pre-grooves 311 formed in the reflective layer 203 differ by twice the width of each color forming portion.

As shown in FIGS. 18 and 19, the color forming layer 310 consists of color forming portions (multi-color forming portions) 320 as sets of three annular color forming portions, the annular green color forming portion 321 located in a position corresponding to each one of the pre-grooves 311 formed on a large number of circles, as well as the annular blue color forming portion 322 and red color forming portion 323 which are located on the inner and outer circles adjacent to the circle on which the green color forming portion 321 is located. Thus, the color forming layer 310 is composed of as many annular color forming portions as the pre-grooves 311 and they are positioned at different radii on concentric circles about the center of the optical disc D.

The green color forming portion 321, the blue color forming portion 322 and the red color forming portion 323 have thermal sensitive materials that form respective colors on account of the heat generated upon illumination with laser. In the above-described first embodiment, the respective color formers have such a characteristic that they must be given different amounts of energy to form colors; the thermal sensitive materials to be used in the second embodiment have such a characteristic that the respective colors are formed upon application of the same amount of energy.

In order to form the annular color forming portions 320 on the image surface of the optical disc D2, the annular green, blue and red color forming portions 321, 322 and 323 may be printed on the surface of the reflective layer 203. The smaller the width of each color forming portion, the higher the precision that is required for the printing process to be employed and the higher the cost that is incurred. Therefore, in the embodiment under consideration, as FIGS. 18 and 19 show, the two green color forming portions 321 provided in the positions that correspond to two adjacent pre-grooves 311 are spaced by two portions that form the same color (blue or red). With this arrangement, the space between adjacent pre-grooves 311 can be printed in the same color, doubling the width of a print of the same color and thus enabling the printing operation to be performed with comparative ease.

Described above is the construction of the optical disc D2 which is used in the image forming method according to the second embodiment of the invention.

B-2. Color Image Forming Method

Figure 20:
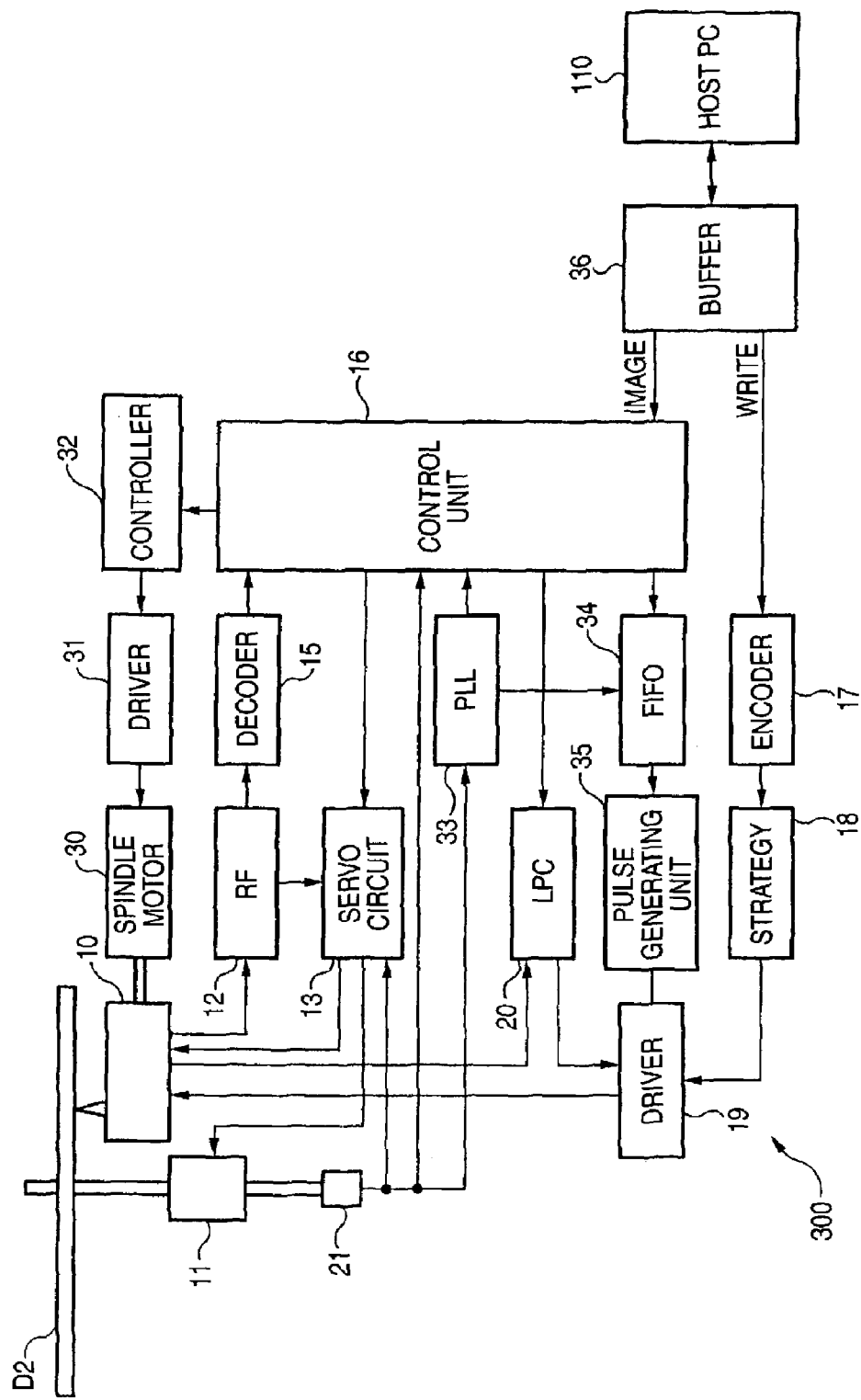
FIG. 20 is a block diagram showing the construction of the optical disc record/reproduce apparatus used in the image forming method according to the second embodiment of the invention.

We next describe the method of forming a color image on the image surface of the optical disc D2 having the construction described above. As in the first embodiment, the color image forming method according to the second embodiment is performed with an optical disc record/reproduce apparatus that can write information to and reproduce it from the optical disc by illuminating the optical disc with laser. FIG. 20 shows the construction of the optical disc record/reproduce apparatus for use in the color image forming method according to the second embodiment of the invention.

As is clear from FIG. 20, the optical disc record/reproduce apparatus generally indicated by 300 has the same construction as the optical disc record/reproduce apparatus 100 according to the first embodiment except that it does not have the ultraviolet fluorescent lamps 45 and 46 (see FIG. 5). The optical disc record/reproduce apparatus 300 is also the same as the optical disc record/reproduce apparatus 100 in terms of the manner of control during color image formation, as exemplified by the practice of forming an image in synchronism with clock signals that are multiples of FG pulses; on the other hand, the two apparatuses differ in the order of transferring the color image forming data that is to be utilized and in the manner of control such as tracking control. On the pages that follow, the method of forming a color image on the image surface of the optical disc D2 using the optical disc record/reproduce apparatus 300 is described, with emphasis placed on the order of transferring the color image forming data that is to be utilized and on the manner of control such as tracking control.

We first describe the content of the color image data the host PC 110 supplies to the optical disc record/reproduce apparatus 300 in order to form a color image. The color image data used in the embodiment under consideration is the same as the color image data used in the first embodiment (see FIG. 7) and tricolor (green, blue, red) density related information associated with the colors (primary colors and intermediate colors other than primaries) that are to be formed at respective coordinate points is contained in such a way that a set of coordinate points P11, P12, ... P1n located on the pre-groove 311 in the innermost circle are surrounded by a set of coordinate points P21, P22, ... P2n located on the pre-groove 311 in the second innermost circle, which in turn are surrounded by a set of coordinate points located on the pre-groove 311 in the third innermost circle until a coordinate Pmn located on the pre-groove 311 in the outermost (mth) circle is reached.

Figure 21:
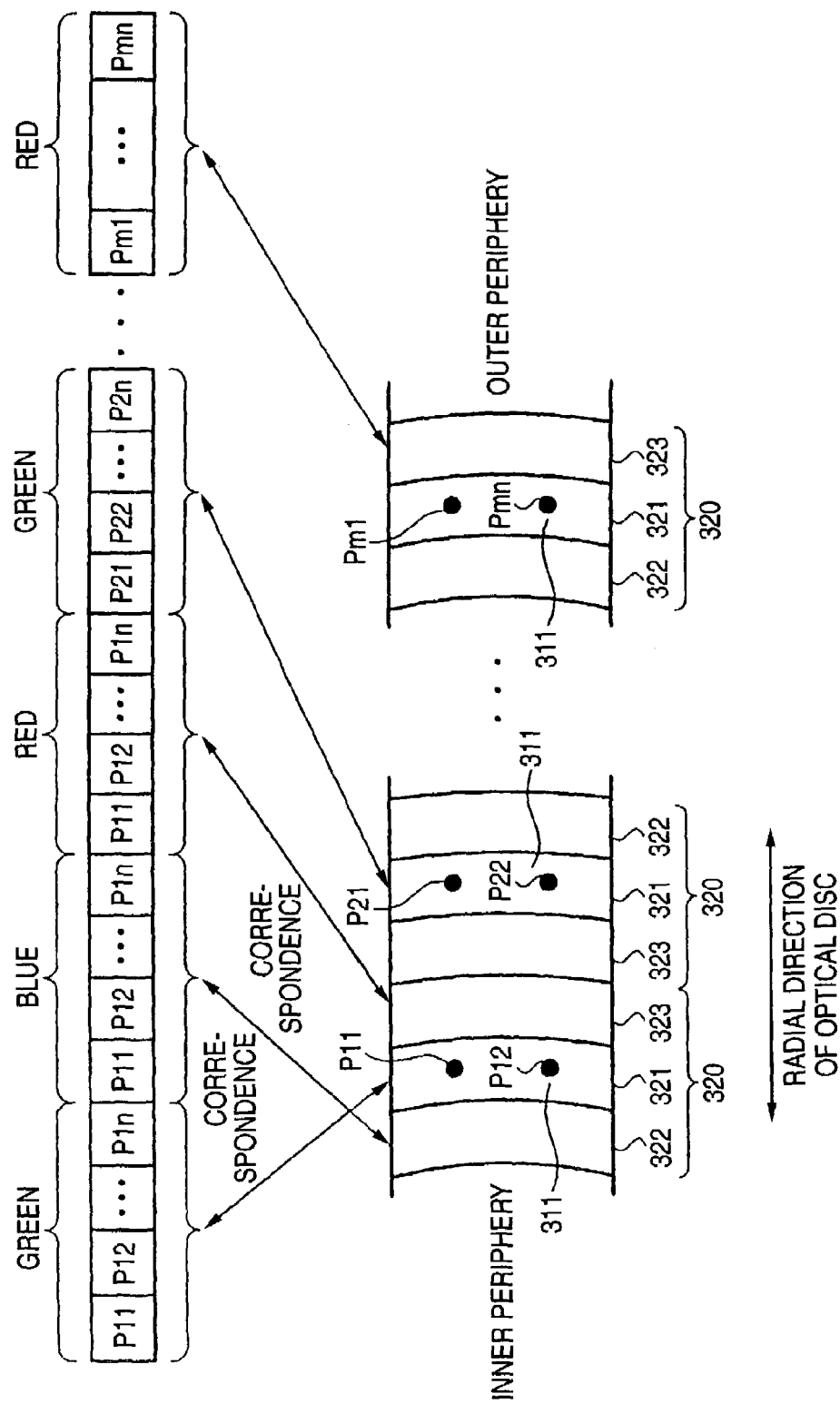
FIG. 21 is a diagram illustrating the order of transferring the color image data to the drive pulse generating unit in the optical disc record/reproduce apparatus used in the second embodiment.

In the first embodiment, the image data being supplied from the host PC 110 is transferred in such a way that the density information about blue color is first sent for all coordinate points, with the density information about green color being then sent for all coordinate points and only thereafter is sent the density information about red color for all coordinate points (see FIG. 8). In the embodiment under consideration, as FIG. 21 shows, the host PC 110 sends out density information for each color at all coordinate points (P11~P1n) that are located on the pre-groove 311 in the innermost circle of the optical disc D and thereafter it sends out density information for each color at all coordinate points (P21~P2n) that are located on the pre-groove 311 in the second innermost circle. Thus, in the second embodiment, color image data is transferred starting from the pre-groove 311 in the innermost circle such that density information for each color is sent out for all the coordinate points located on one pre-groove 311 and that, thereafter, density information for each color is sent out for all the coordinate points located on the pre-groove 311 in the adjacent outer circle.

In the embodiment under consideration, the order in which density information for different colors is output for the coordinate points located on each pre-groove 311 is determined in the following manner. As already mentioned, the optical disc D2 has the green color forming portion 321 provided along one pre-groove 311 and the blue color forming portion 322 and the red color forming portion 323 are provided on opposite sides of the green color forming portion 321. In the embodiment under consideration, among the three color forming portions 321, 322 and 323 that belong to the color forming portion 320, the density information for green color which is located on the pre-groove 311 is transferred first and the order of transferring the subsequent two colors is determined by the order in which their color forming portions are arranged in a radial direction. Specifically, the density information for the color that corresponds to the color forming portion that is located on an inner circle is transferred first. Consider, for example, the case where the color forming portions 320 are arranged in the order shown in the lower part of FIG. 21; in that case, as for the coordinate points (P11~P1n) on the pre-groove 311 in the innermost circle, density information is transferred in the order of green, blue and red (see the upper part of FIG. 21). As for the coordinate points (P21~P2n) on the pre-groove 311 in the second innermost circle, density information is transferred in the order of green, red and blue. The order under discussion is the same as that employed in transferring density information to the FIFO memory 34 and one may adopt such a configuration that the density information supplied from the host PC 110 in the order described above is transferred to the FIFO memory 34 in the same order from the control unit 16 in the optical disc record/reproduce apparatus 300; alternatively, the data supplied from the host PC 110 in a different order than described above may be rearranged by the control unit 16 into the order described above before it is transferred to the FIFO memory 34.

In the optical disc record/reproduce apparatus 300 used to implement the image forming method according to the second embodiment, once the color image data of the above-described composition as supplied from the host PC 110 has been transferred to the FIFO memory 34 in the above-described order, the subsequent procedure is the same as in the above-described first embodiment, ie., the color image data is output to the drive pulse generating unit 35 in synchronism with clock signals which are multiples of the FG pulses generated by the frequency generator 21, whereupon pulse signals of a pulse width associated with the density information for each color at the respective coordinates are generated in the drive pulse generating unit 35 and then supplied to the laser driver 19 which causes laser of the WRITE level to illuminate the optical disc D2 for a time period that corresponds to the pulse width.

We next describe how the optical disc record/reproduce apparatus 300 operates when a color image is formed by controlling the laser from the optical pickup 10 in accordance with the density information supplied in the order described above.

Figure 22:
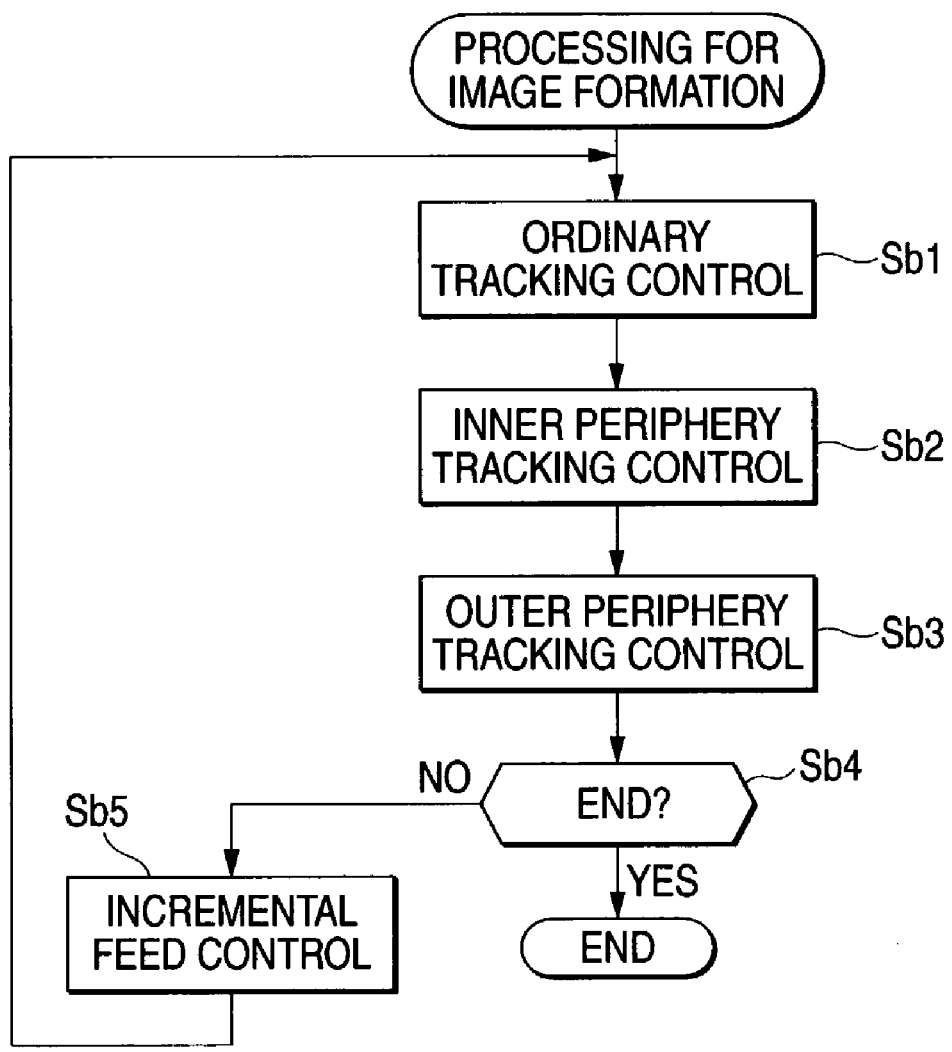
FIG. 22 is a flowchart illustrating the operation of the optical disc record/reproduce apparatus used in the second embodiment.

To start, when the optical disc D2 is inserted, the control unit 16 in the optical disc record/reproduce apparatus 300 performs the same processing as in the above-described first embodiment (steps Sa1~Sa6 in FIG. 13); having completed the initializing step, the control unit 16 performs actual processing for the formation of a visible image on the image surface of the optical disc D2. As FIG. 22 shows, the control unit 16, in addition to transferring the color image data to the FIFO memory 34 in the above-described order after it was supplied from the host PC 110 via the buffer memory 36, sets a target value for tracking control to be performed by the servo circuit 13 which moves the position of laser such that it illuminates the optical disc D2 along the pre-groove 311 in the innermost circle. In other words, the control unit 16 controls the servo circuit 13 so that it performs ordinary tracking control to move the position of illumination with laser along the pre-groove (step Sb1). Note that the control unit 16 also controls the servo circuit 13 to perform focus control such that the spot diameter of the laser applied to the color forming portion 320 is substantially the same as the width of each of the three different color forming portions 321 (green), 322 (blue) and 323 (red), say, 20 µm.

Figure 16:
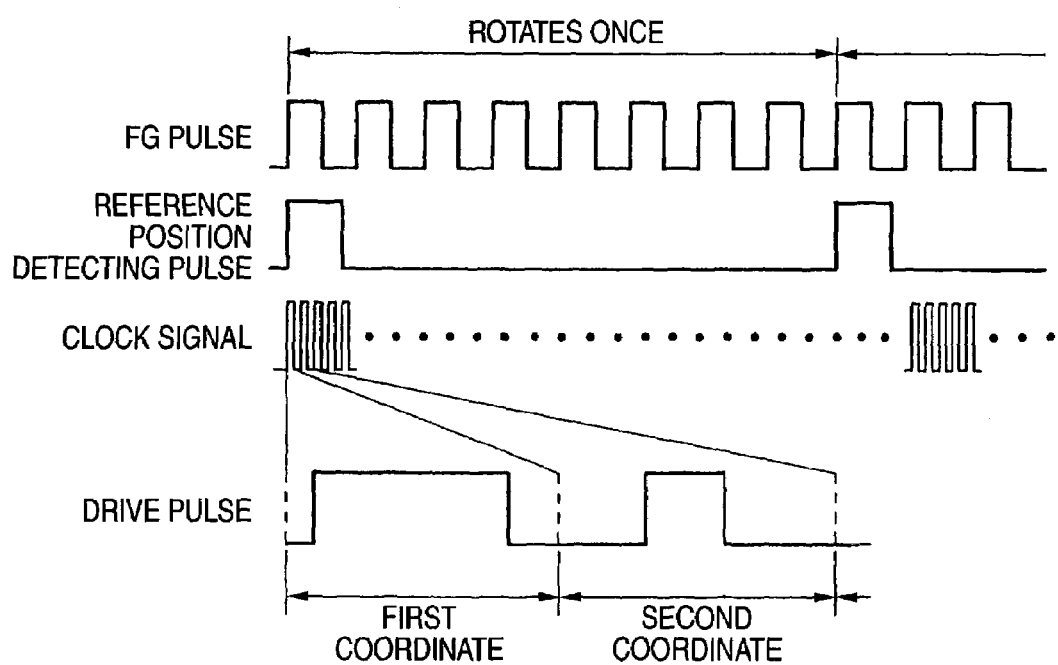
FIG. 16 is a timing chart for illustrating the operation of the optical disc record/reproduce apparatus as the image surface of the disc is illuminated with laser to form a color image.
Figure 23A:
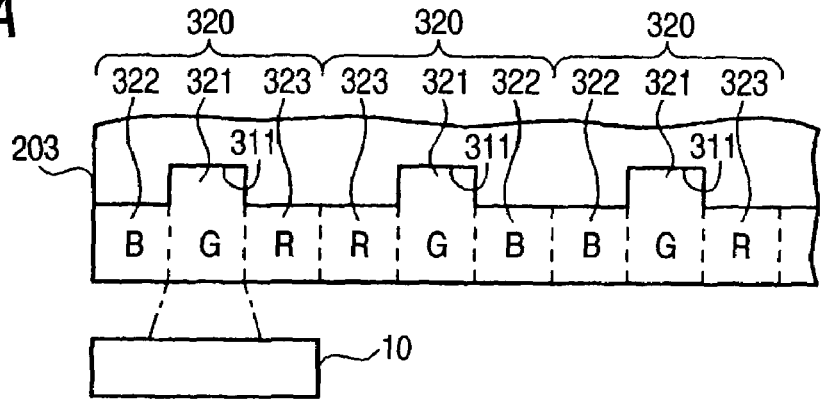
FIGS. 23A to 23D shows schematically how the color forming layer on the disc is allowed to form colors by means of the optical disc record/reproduce apparatus used in the second embodiment.

Then, in addition to causing the servo circuit 13 to perform ordinary tracking control such that the position of illumination with laser is moved along the pre-groove 311, the control unit 16 causes laser to be applied in accordance with the image data supplied in the already-described order, namely, the green density information for the coordinate points (P11~P1n) along the pre-groove 311 in the innermost circle. Specifically, as FIG. 23A shows, in accordance with the green density information, the green color forming portion 321 provided on the pre-groove 311 is illuminated with laser (as delineated by the long and short dashed line) so that it forms color. This process of controlling the application of laser is the same as described in the first embodiment; while a train of FG pulse signals are supplied from the frequency generator 21 as the optical disc D makes a full turn (see FIG. 12), the rise of a reference pulse provides a trigger for the control unit 16 to control the respective components such that image data are sequentially output from the FIFO memory 34 in synchronism with clock signals being output from the PLL circuit 33 since the rise time of the reference pulse. As the result of this control, each time clock pulses are supplied from the PLL circuit 33, the FIFO memory 34 outputs information indicative of the density at one coordinate to the drive pulse generating unit 35 (see FIG. 16) and laser associated with the density of interest is applied to that region in the optical disc D2 which corresponds to the coordinate of interest.

Thereafter, when a reference pulse is supplied from the frequency generator 21, or when the optical disc D2 rotates fully once after the green color forming portion 321 was illuminated with laser for realizing color formation, the control unit 16 stops issuance of the laser on the basis of the image data and, in addition, controls the servo circuit 13 such that the target position of tracking is shifted to a circle which is inward of the pre-groove 311 that is providing the current target of tracking. More specifically, the control unit 16 changes the target position of tracking such that laser is applied to the color forming portion located in a circle inward of the green color forming portion 321 (the blue color forming portion 322 is illuminated if the green color forming portion 321 is in the innermost circle (see FIG. 21)). If the optical disc record/reproduce apparatus 300 is of a type that performs tracking by the known three-beam method, the target value of tracking error signals that is determined by the difference between the reflected components of two auxiliary beams is changed to such a value that tracking is effected to the above-defined position.

Figure 23B:
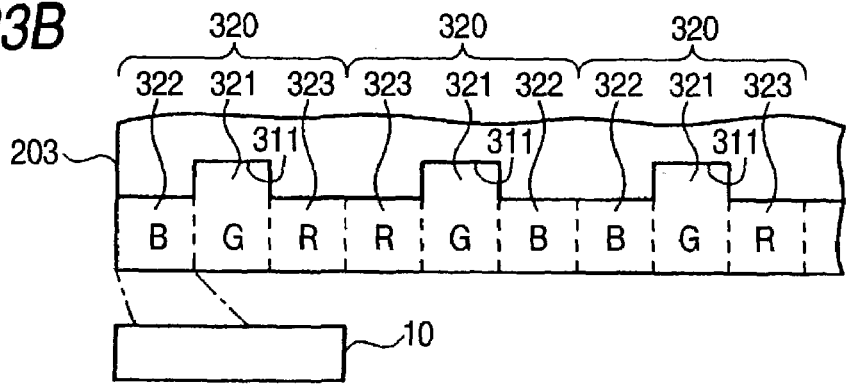

Then, in addition to causing the servo circuit 13 to perform tracking control targeting the position in a circle that is inward of the pre-groove 311, the control unit 16 causes laser to be applied in accordance with the image data supplied in the already-described order, namely, the blue density information for the coordinate points (P11~P1n) along the pre-groove 311 in the innermost circle (step Sb2). Specifically, as FIG. 23B shows, in accordance with the blue density information, the blue color forming portion 322 provided in a circle that is inward of the pre-groove 311 is illuminated with laser (as delineated by the long and short dashed line) so that it forms color.

Thereafter, when a reference pulse is supplied from the frequency generator 21, or when the optical disc D2 rotates fully once after the blue color forming portion 322 was illuminated with laser for realizing color formation, the control unit 16 controls the servo circuit 13 such that the target position of tracking is shifted to a circle which is outward of the pre-groove 311. More specifically, the control unit 16 changes the target position of tracking such that laser is applied to the color forming portion located in a circle outward of the green color forming portion 321 (the red color forming portion 323 is illuminated if the green color forming portion 321 is in the innermost circle (see FIG. 21)).

Figure 23C:
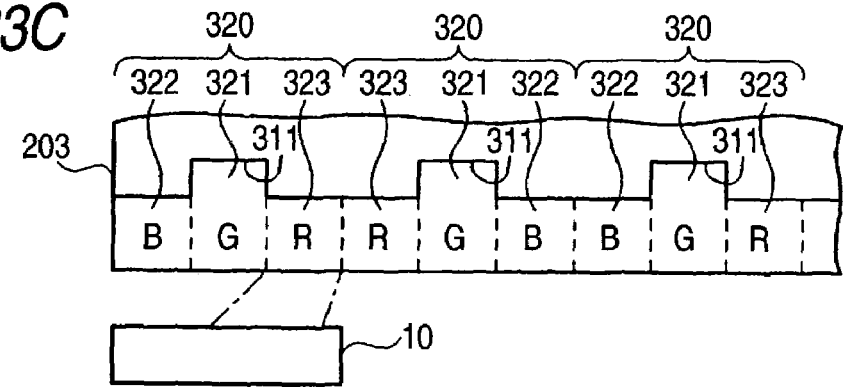

Then, in addition to causing the servo circuit 13 to perform tracking control targeting the position in a circle that is outward of the pre-groove 311, the control unit 16 causes laser to be applied in accordance with the image data supplied in the already-described order, namely, the red density information for the coordinate points (P11~P1n) along the pre-groove 311 in the innermost circle (step Sb3). Specifically, as FIG. 23C shows, in accordance with the red density information, the red color forming portion 323 provided in a circle that is outward of the pre-groove 311 is illuminated with laser (as delineated by the long and short dashed line) so that it forms color.

When the color forming portion 320 consisting of three different color forming portions 321 (green), 322 (blue) and red (323) has been fully illuminated with laser, the control unit 16 determines if the image forming process has been completed for all of the image data (step Sb4).

Figure 23D:
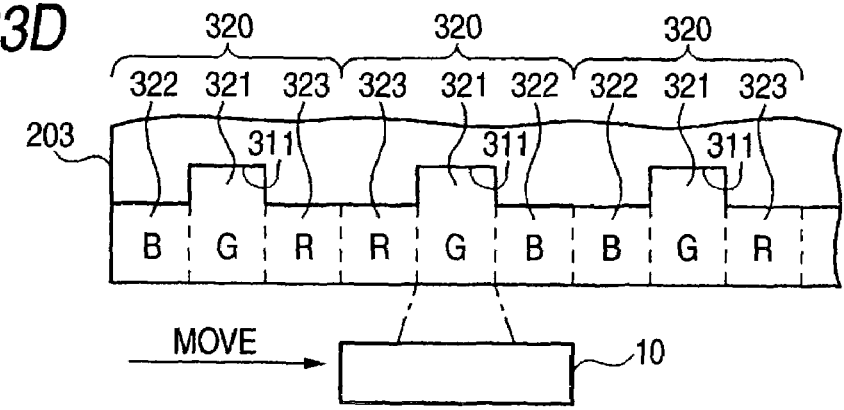

If it is found that processing has not ended for all of the image data, the control unit 16 instructs the motor controller 32 to move the optical pickup 10 radially outward by an amount equal to the width of the above-described color forming portion 320 (step Sb5). In response to this instruction, the motor controller 32 drives the stepping motor 30 via the motor driver 31, whereupon the optical pickup 10 is moved from the center outward by an amount equal to the width of the color forming portion 320 as shown in FIG. 23D. Thereafter, the process of controlling the application of laser to the color forming portion 320 provided along the pre-groove 311 in the adjacent outer circle is performed in the sequence of steps Sb1~Sb3 and the process ends when it has been completed for all of the image data.

Described above are the characteristic operations of the optical disc record/reproduce apparatus 300 and according to the image forming method using this optical disc record/reproduce apparatus 300, there is no need to install additional printing means and the like and all components of the apparatus including the optical pickup 10 that are used to write information to the recording surface of the optical disc D2 are utilized to a maximum extent such that the image surface on the opposite side of the optical disc D2 is illuminated with laser to form a color visible image associated with the color image data.

B-3. Modifications of the Second Embodiment

In the above-described second embodiment of the invention, a color image is formed on the optical disc D2 having the color forming portion 320 which consists of the green color forming portion 321, the blue color forming portion 322 and the red color forming portion 323. Alternatively, one may use an optical disc that has a YMC tricolor forming portion in place of the color forming portion 320, or an optical disc in which the color forming portion 320 has two color forming portions.

In the above-described second embodiment, the density of each color to be formed is controlled by adjusting the area of a color forming region that belongs to one coordinate in each of the three color forming portions 321 (green), 322 (blue) and 323 (red). If color formers of such a characteristic that color density varies with the amount of energy applied are incorporated in the green, blue and red color forming portions 321, 322 and 323, the density of each color's formation at each coordinate can also be controlled by applying laser of a density-associated intensity.

Figure 24:
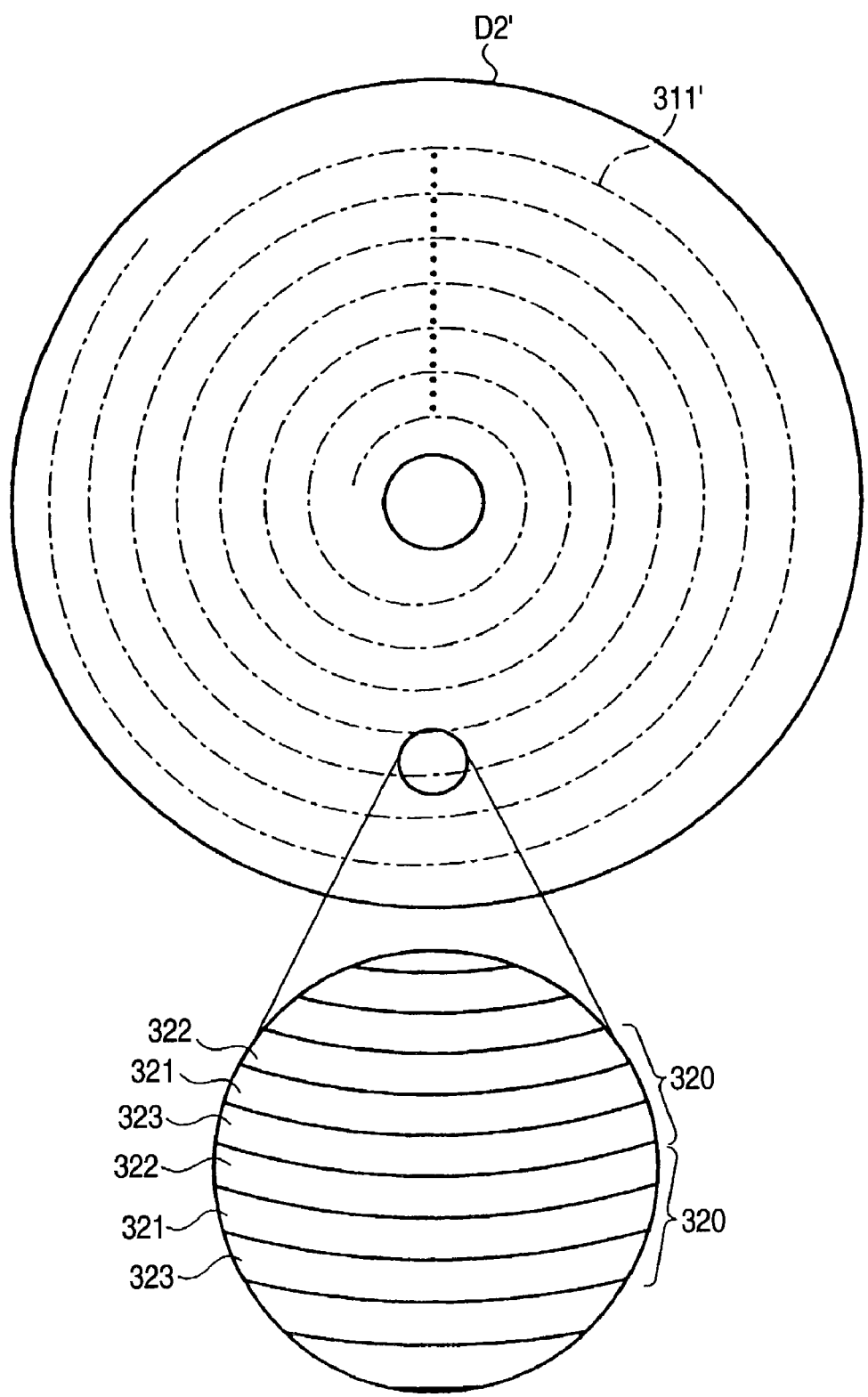
FIG. 24 shows the image surface of a modified version of the disc for use in the second embodiment, as well as showing part of it enlarged.

Further, in the above-described second embodiment, the optical disc D2 has a large number of pre-grooves 311 formed in concentric circles about its center O and the annular color forming portions 320 are provided in areas that correspond to the respective pre-grooves 311. An alternative optical disc design is shown in FIG. 24 and indicated by D2"; this optical disc has a spiral pre-groove 311' formed in a surface, with a spiral color forming portion 320' being formed in areas that correspond to said pre-groove 311'. If color forming portions 320 are to be formed along the spiral pre-groove 311' in the case under consideration, the order in which the green color forming portion 321, the blue color forming portion 322 and the red color forming portion 323 are arranged radially is the same in every radial position; in the illustrated case, the blue color forming portion 322, the green color forming portion 321 and the red color forming portion 323 are arranged in the order written, with the blue color forming portion 322 located in the inner circle. As in the second embodiment described above, the optical disc record/reproduce apparatus 300 illuminates each color forming portion with laser in accordance with each color's density information at each coordinate, whereby a color image can be formed on the image surface of the optical disc D2" in the same manner as described above.

C. Third Embodiment

We next describe the image forming method according to the third embodiment of the invention. The image forming method according to the third embodiment of the invention is the same as in the above-described first embodiment and can form an image formed of multiple colors, namely, a color image on the label surface of an optical disc using an optical disc record/reproduce apparatus. To begin with, the construction of the optical disc that is used to implement this method is described below.

C-1. Construction of the Optical Disc

Figure 26:
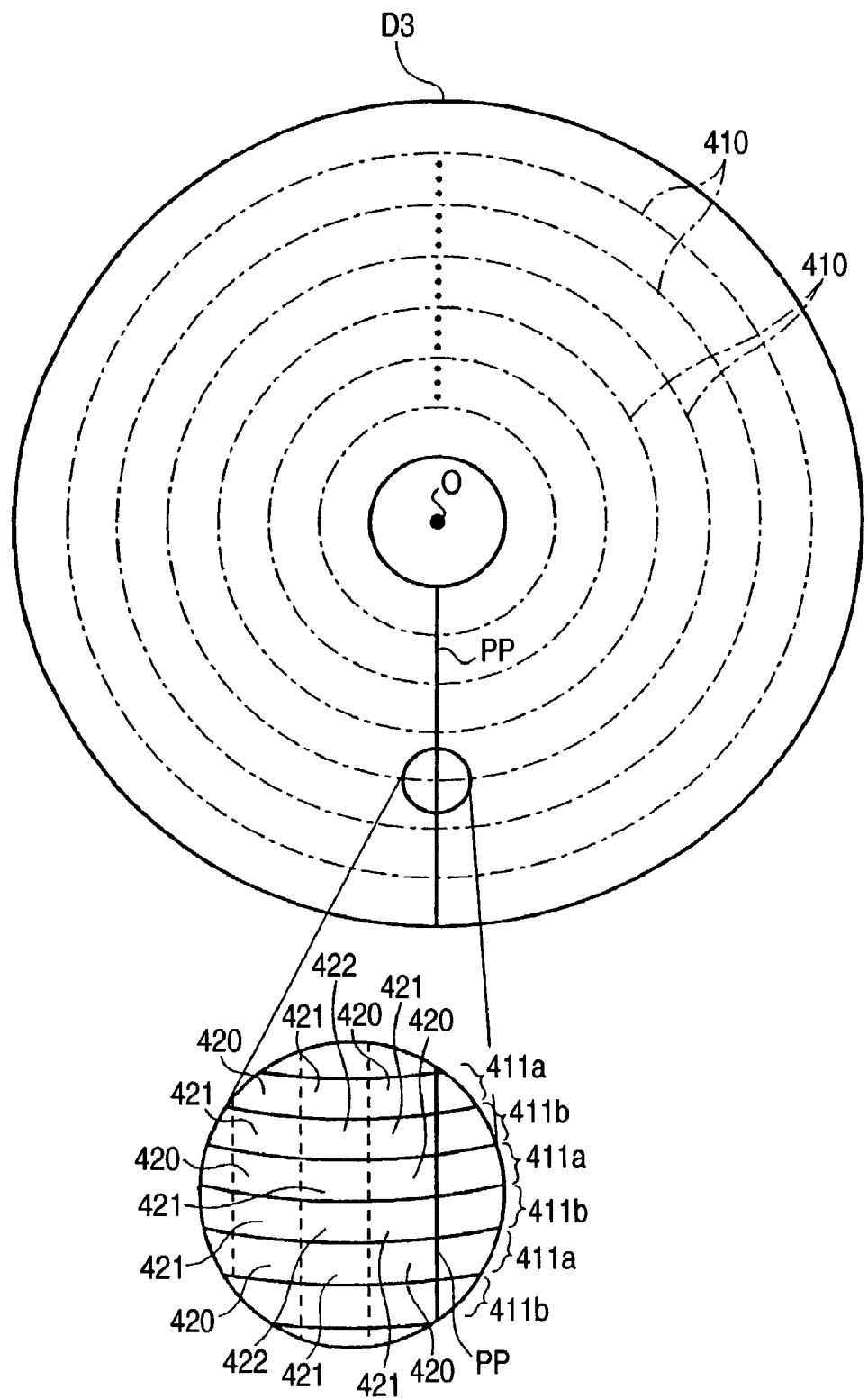
FIG. 26 shows the image surface of the disc for use in the third embodiment, as well as showing part of it enlarged.

The optical disc D3 used in the image forming method according to the third embodiment is the same as the optical disc D according to the first embodiment and it has substantially the same outer shape and dimensions as the optical discs such as the CD specified in the Red Book, as well as the CD-R and CD-RW specified in the Orange Book; the construction of the optical disc D3 is illustrated in FIGS. 25 and 26.

The optical disc D3 according to the third embodiment is the same as the optical disc D according to the above-described first embodiment in that it has a recording surface on one side (the surface on the upper side of FIG. 25) and an image surface on the other side (the surface on the lower side of FIG. 25). As shown in FIG. 25, the optical disc D3 has a similar construction to the optical disc D in that it has a protective layer 201, a recording layer 202 and a reflective layer 203, with a color forming layer 410 and a protective layer 208 lying under the reflective layer 203. FIG. 25 is no more than a schematic representation of the construction of the optical disc D3 and the relative dimensions and the like of the respective layers are not exactly the same as shown.

As is clear from FIG. 26, when seen from the image surface (the lower side of FIG. 25), the color forming layer 410 consists of annular color forming portions 411 located on a large number of concentric circles about the center C of the optical disc D3. Each of the annular color forming portions 411 consists of two areas, one being a blue-green color forming portion 411a where two color forming regions, i.e., a blue color forming region 420 and a green color forming region 411 alternate in a circumferential direction, and the other being a red-green color forming portion 411b where a red color forming region 422 and a green color forming region 421 are juxtaposed circumferentially. The two annular areas, the blue-green color forming portion 411a and the red-green color forming portion 411b, are provided alternately. To give a typical example, if the blue-green color forming portion 411a is provided in the innermost circle, the red-green color forming portion 411b is provided in the second innermost circle, and another blue-green color forming portion 411a is provided on the third innermost circle.

The color forming layer 410 is provided to cover substantially all surface of the optical disc D3 and a pre-pit PP is formed in that layer at one location to extend from the innermost to the outermost periphery. Therefore, the reflected light obtained when the position of illumination with laser from the optical disc recording apparatus, etc. crosses the pre-pit PP will differ from the reflected light obtained when other areas are crossed and by monitoring the reflected light, one can detect the crossing of the pre-pit PP by the position of laser illumination.

Figure 27:
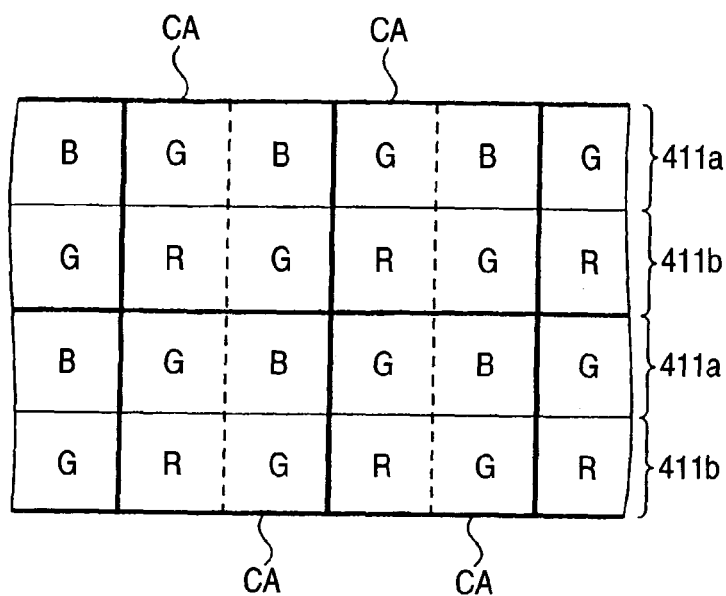
FIG. 27 illustrates the composition of regions in the color forming layer of the disc used in the third embodiment.

As already mentioned, the blue-green color forming portion 411a consists of the blue color forming region 420 and the green color forming region 421 that alternate in a circumferential direction; these portions are arranged, as seen clockwise from the above-mentioned pre-pit PP, in the order of the blue color forming region 420, the green color forming region 421 and the blue color forming region 420. The red-green color forming portion 411b consists of the green color forming region 421 and the red color forming region 422 that alternate in a circumferential direction; these portions are arranged, as seen clockwise from the pre-pit PP, in the order of the green color forming region 421, the red color forming region 422 and the green color forming region 421. The optical disc D3 having the respective color forming portions arranged in the manner described above is used in the embodiment under consideration and, as shown in FIG. 27, four color forming regions bounded by thick lines across the adjacent blue-green color forming portion 411a and red-green color forming portion 411b (in FIG. 27, the green color forming region 421 is labeled G, the red color forming region 422 as R, and the blue color forming region 420 as B) are put together to make a single color image representing area CA, and a variety of color representation is realized by appropriately controlling the densities of colors obtained from the four color forming portions in that color image representing area CA.

The width of each annular color forming portion 411 (its length as measured in the radial direction of the optical disc D3) may be within a size not greater than the spot diameter of a laser which can be applied to the optical disc D3 by means of the optical disc record/reproduce apparatus; a typical value of this width is 20 μm.

The blue color forming region 420, the green color forming region 421 and the red color forming region 422 have thermal sensitive materials that form respective colors on account of the heat generated upon illumination with laser. In the above-described first embodiment, the respective color formers have such a characteristic that they must be given different amounts of energy to form colors; the thermal sensitive materials to be used in the third embodiment have such a characteristic that the respective colors are formed upon application of the same amount of energy.

The annular blue-green color forming portion 411a and red-green color forming portion 411b may be formed on the image surface of the optical disc D3 by printing.

Described above is the construction of the optical disc D3 which is used in the image forming method according to the third embodiment of the invention.

C-2. Color Image Forming Method

We next describe the method of forming a color image on the image surface of the optical disc D3 having the construction described above. As in the first embodiment, the color image forming method according to the third embodiment is performed with an optical disc record/reproduce apparatus that can write information to and reproduce it from the optical disc by illuminating the optical disc with laser. The optical disc record/reproduce apparatus to be used in the color image forming method according to the embodiment under consideration has the same hardware configuration as the optical disc record/reproduce apparatus 300 for use in the second embodiment but it differs from the second embodiment in terms of the content of the color image forming data that is to be utilized and in the manner of controlling the illumination with laser on the basis of that color image forming data. On the pages that follow, the method of forming a color image on the image surface of the optical disc D3 using the optical disc record/reproduce apparatus 300 is described, with emphasis placed on the differences such as one in terms of the content of the color image forming data that is to be utilized.

Figure 28:
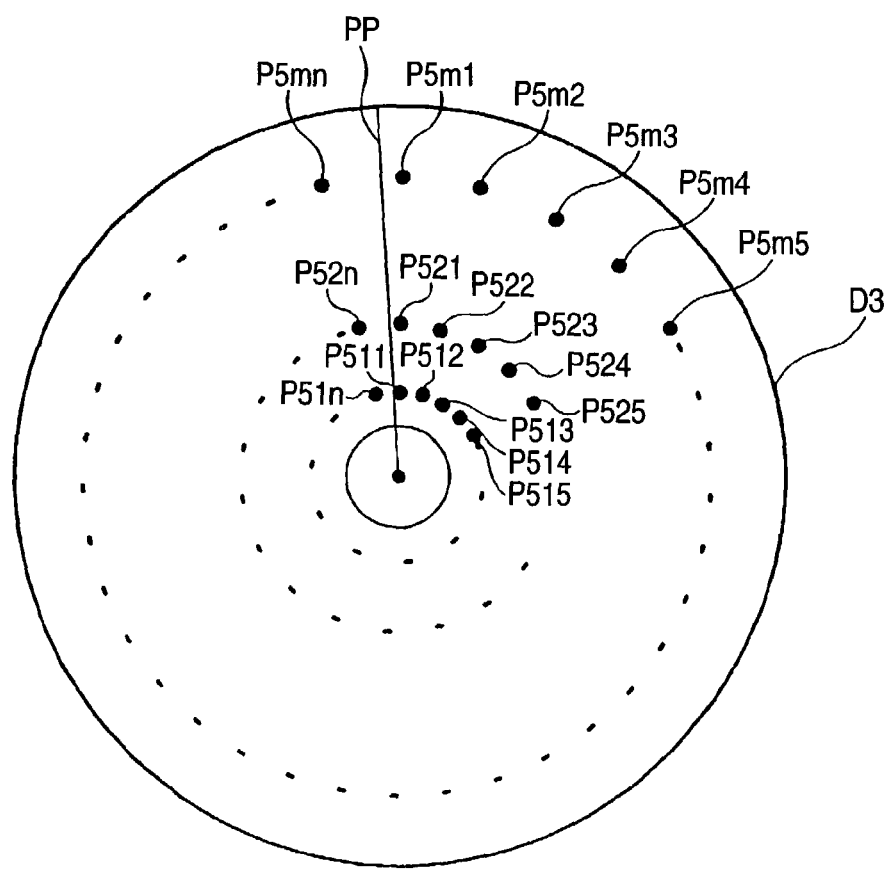
FIG. 28 is a diagram illustrating the content of color image data that is used by the optical disc record/reproduce apparatus to illuminate the disc with laser in the image forming method according to the third embodiment.

We first refer to FIG. 28 in describing the content of the color image data the host PC 110 supplies to the optical disc record/reproduce apparatus 300 in order to form a color image. The color image data to be used in the embodiment under consideration contains information indicative of coloring density at each coordinate point corresponding to the position of the blue color forming region 420, the green color forming region 421 or the red color forming region 422 of the optical disc D3 (see FIG. 26). Stated more specifically, density related information associated with the colors to be formed at respective coordinate points is contained in such a way that a set of coordinate points P511, P512, . . . P51n corresponding to the respective color forming regions contained in the color forming portion 411 (either the blue-green color forming portion 411a or the red-green color forming portion 411b) that is located in the innermost circle are surrounded by a set of coordinate points P521, P522, . . . P52n corresponding to the respective color forming regions contained in the color forming portion 411 located in the second innermost circle, which in turn are surrounded by a set of coordinates corresponding to the respective color forming regions contained in the color forming portion 411 located in the third innermost circle until a coordinate P5mn contained in the color forming portion 411 located in the outermost (mth) circle is reached. Thus, in the image forming method using the above-described color image data, each coordinate point corresponds to the region dedicated to forming either blue, green or red color alone. Therefore, in the color image data under discussion, the color image representing area CA which is composed of the above-described four color forming regions, namely, containing four coordinate points (see FIG. 27) is recognized as the desired color by the viewer and the relative densities of the four coordinate points (R, G, G and B) contained in one color image representing region CA are so determined as to meet this requirement.

The color image data used in the embodiment under consideration contains density information at the coordinate points corresponding to the respective color forming regions contained in each annular color forming 411 and such density information is transferred clockwise in FIG. 26 starting from the position of the pre-pit PP (see FIG. 26). Therefore, in the case shown schematically in FIG. 28, density information at the respective coordinates is transferred in the order of P511, P512, P513, . . . P51n. This order is the same as that employed in transferring density information to the FIFO memory 34 and one may adopt such a configuration that the density information supplied from the host PC 110 in the order described above is transferred to the FIFO memory 34 in the same order from the control unit 16 in the optical disc record/reproduce apparatus 300; alternatively, the data supplied from the host PC 110 in a different order than described above may be rearranged by the control unit 16 into the order described above before it is transferred to the FIFO memory 34.

In the optical disc record/reproduce apparatus 300 used to implement the image forming method according to the third embodiment, once the color image data of the above-described composition as supplied from the host PC 110 has been transferred to the FIFO memory 34 in the above-described order, the subsequent procedure is the same as in the aforementioned second embodiment, i.e., the color image data is output from the FIFO memory 34 to the drive pulse generating unit 35 in synchronism with clock signals which are multiples of the FG pulses generated by the frequency generator 21. As a result, pulse signals of a pulse width associated with the density information at each coordinate point are generated in the drive pulse generating unit 35 and then supplied to the laser driver 19 which allows the region in the optical disc D2 corresponding to the coordinate point to be illuminated with laser of the WRITE level for a time period that corresponds to the pulse width.

As described above, the optical disc record/reproduce apparatus 300 controls the laser as it is issued from the optical pickup 10 in accordance with the density information that is supplied in the above-stated order. More specifically, when the optical disc D3 is inserted, the control unit 16 in the optical disc record/reproduce apparatus 300 performs the same processing as in the above-described first embodiment (steps Sa1~Sa6 in FIG. 13); having completed the initializing step of causing the position of illumination with laser from the optical pickup 10 to be moved to the position that corresponds to the color forming portion 411 in the innermost circle, the control unit 16 performs actual processing for the formation of a visible image on the image surface of the optical disc D3.

Figure 29:
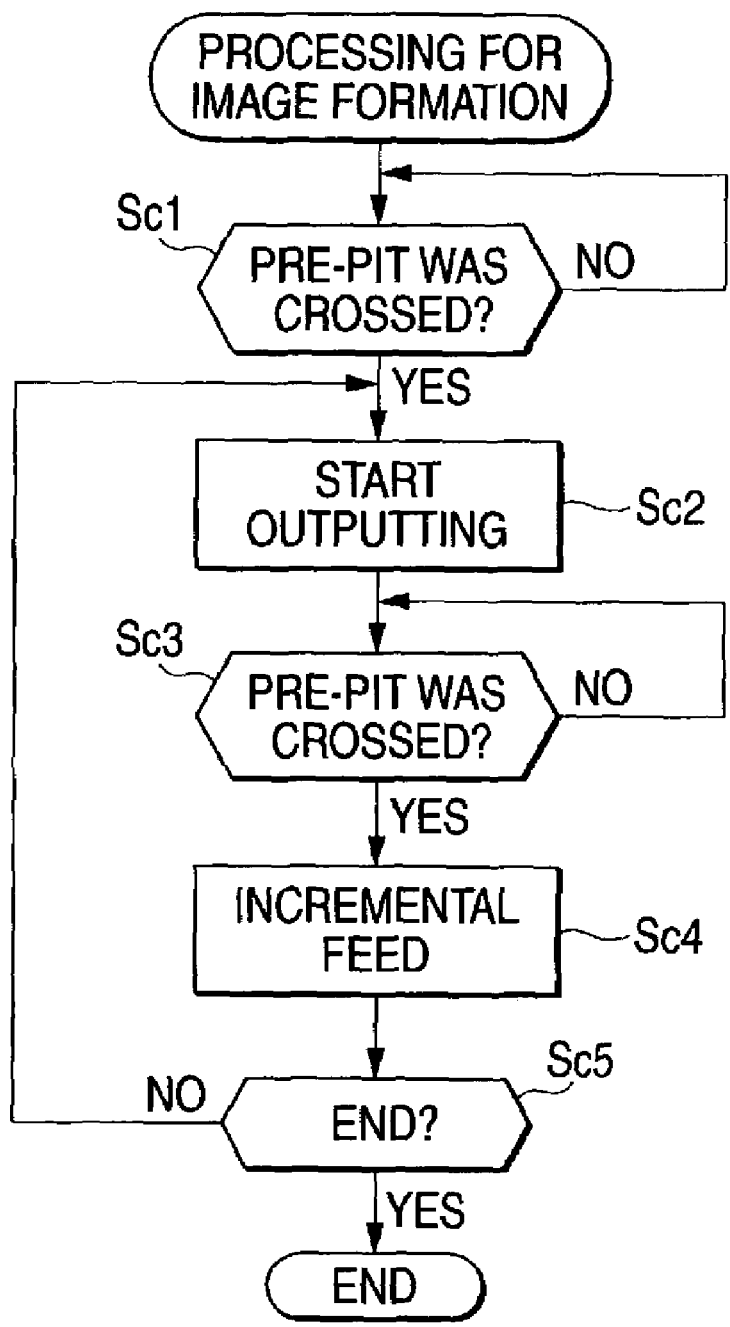
FIG. 29 is a flowchart illustrating the operation of the optical disc record/reproduce apparatus according to the third embodiment.

As FIG. 29 shows, the control unit 16, in addition to transferring the color image data to the FIFO memory 34 in the above-described order after it was supplied from the host PC 110 via the buffer memory 36, performs monitoring on the basis of the RF signal associated with the reflected light from the disc D3 as it is supplied from the RF amplifier 12 in order to check to see if the position of illumination with laser has crossed the pre-pit PP (step Sc1); if the crossing of the pre-pit PP is detected, the control unit 16 controls the respective components such that image data are sequentially output from the FIFO memory 34 in synchronism with clock signals being output from the PLL circuit 33 since that time of detection (step Sc2). As the result of this control, each time clock pulses are supplied from the PLL circuit 33, the FIFO memory 34 outputs information indicative of the density at one coordinate to the drive pulse generating unit 35 (see FIG. 16) and laser associated with the density of interest is applied to the region in the optical disc D3 which corresponds to the coordinate of interest.

After the application of laser was initiated in the manner just described above, the control unit 16 performs monitoring in order to check to see if the position of illumination with laser from the optical pickup 10 has crossed the pre-pit PP (step Sc3). If the crossing of the pre-pit PP is detected, or when the optical disc D3 rotates fully once after laser began to be applied to the color forming portion 411 for color formation, the control unit 16 instructs 5 the motor controller 32 to move the optical pickup 10 radially outward by an amount equal to the width of the above-described color forming portion 411 (step Sc4). In response to this instruction, the motor controller 32 drives the stepping motor 30 via the motor driver 31, whereupon the optical pickup 10 is moved from the center outward by an amount equal to the width of the color forming portion 411.

After these steps, decision is made as to whether illumination with laser has ended for all of the image data (step Sc5). If it has not, the sequence returns to step Sc2 and the crossing of the pre-pit PP by the position of illumination with laser provides a trigger for the control unit 16 to start outputting the color image data from the FIFO memory 34 to the drive pulse generating unit 35 in order to illuminate the color forming portion 411 in the adjacent outer circle. This process is subsequently repeated until all color forming portions 411 formed in a large number of concentric circles on the image surface of the optical disc D have been illuminated with laser to form a color image associated with the color image data on the image surface of the optical disc D3.

Described above is the image forming method according to the third embodiment of the invention and if this image forming method is employed, there is no need to install additional printing means and the like and all components of the apparatus including the optical pickup 10 that are used to write information to the recording surface of the optical disc D3 are utilized to a maximum extent such that the image surface on the opposite side of the optical disc D3 is illuminated with laser to form a color visible image associated with the color image data.

C-3. Modifications of the Second Embodiment

In the above-described third embodiment of the invention, a color image is formed on the optical disc D3 having the color forming portion 411 which consists of three color forming regions, i.e., the blue color forming region 420, the green color forming region 421 and the red color forming region 422. Alternatively, one may use an optical disc that has a YMC tricolor forming portion in place of the color forming portion 411, or an optical disc in which the color forming portion 411 has two color forming portions.

In the above-described third embodiment, the density of each color to be formed is controlled by adjusting the area of a color forming region that belongs to one coordinate in each of the three color forming regions 420 (blue), 421 (green) and 422 (red). If color formers of such a characteristic that color density varies with the amount of energy applied are incorporated in the blue, green and red color forming regions 420, 421 and 422, the density of each color's formation at each coordinate can also be controlled by applying laser of a density-associated intensity.

Further, in the above-described third embodiment, the optical disc D3 has a large number of color forming portions 411 formed in concentric circles about its center O. The optical disc D3 may be replaced by one having a spiral color forming portion formed on the side where the image surface is provided. And as in the third embodiment described above, the optical disc record/reproduce apparatus 300 applies laser in accordance with each color's density information at each of the coordinates contained in the color image data being transferred in the same order as described above, whereby a color image can be formed on the image surface of the optical disc D3 in the same manner as described above.

Figure 30:
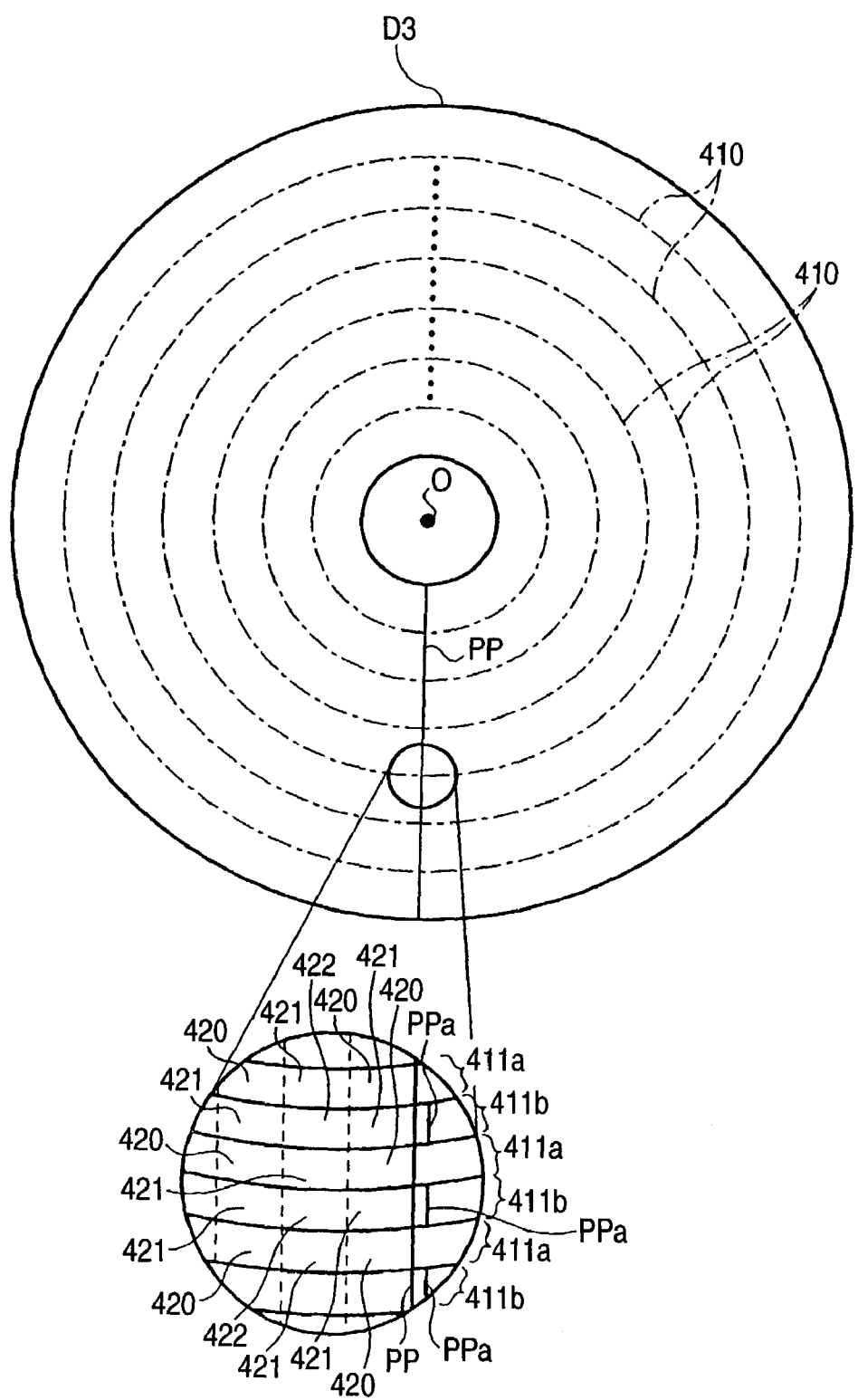
FIG. 30 shows the image surface of a modified version of the disc for use in the third embodiment, as well as showing part of it enlarged.

If desired, as shown in FIG. 30, an additional pre-pit PPa may be provided at a location adjacent the pre-pit PP in only one of the color forming areas of the color forming portion 411, for example, in the red-green color forming portion 411b such that it extends radially. With this design, the reflected light obtained when the position of illumination with laser crosses the neighborhood of the pre-pit PP differs between the blue-green color forming portion 411a and the red-green color forming portion 411b, making it possible for the optical disc record/reproduce apparatus 300 to determine which of the two color forming portions is currently illuminated with laser. The result of this checking can be used to ensure that the laser applied to realize color formation from the blue-green color forming portion 411a will not erroneously be applied to the red-green color forming portion 411b.

If the pre-pit PPa is formed in only one of the two color forming portions 411a and 411b as described above, the shape of the pre-pit (identifying region) can be used by the optical disc apparatus to detect which color forming regions are circumferentially arranged in which order in each of the annular color forming portions 411 with a view to preventing erroneous operation of the apparatus. If desired, pre-pits having different shapes depending upon color may be provided in different color forming regions (e.g. blue color forming region 420), for example, one radially extending pre-pit being provided in the blue color forming region 420 and two radially extending pre-pits in the green color forming region 421; with this design, as the position of illumination with laser crosses each color forming region, the optical disc apparatus can use the reflected light to detect which of the color forming regions, blue, green or red, is being crossed by the position of laser illumination. An advantage of this design is that even if the order of arrangement of three color forming regions in each annular color forming portion is not fixed, the result of detecting which of the color forming regions, blue, green or red, is being crossed by the position of laser illumination can be effectively used to perform control in such a way that the correct region is illuminated with laser on the basis of density information for the color detected by the optical disc apparatus.

D. Modifications

The optical discs D, D2 and D3 used in the three embodiments described above each have a recording surface formed on the side opposite the image surface in such a way that information is recordable (rewritable) to that surface. Alternatively, a non-rewritable recording surface may be formed by preliminary recording of information. Yet another approach is an optical disc having no recording surface.

As described on the foregoing pages, the present invention does not have to use any additional separate equipment and still a multi-colored visible image can be formed on discs using an optical disc apparatus.

What is claimed is:

1. An optical disc apparatus that illuminates a surface of an optical disc with a laser to perform information writing and to perform a tracking servo operation during the recording of data, the optical disc having a recording layer which complies with a given optical disc specification and which is capable of recording data upon illumination with the laser, and a color forming layer which is capable of forming a multi-color image having a plurality of colors upon illumination with the laser, the color forming layer including color formers, which form particular colors depending upon a laser energy or wavelength applied to the color formers, the optical disc apparatus comprising:

an optical pickup for applying the laser to a disc placed in the apparatus; and an illumination control unit that, in response to an instruction for performing image formation on the disc, controls the optical pickup to illuminate the color forming layer of the disc with the laser to form the multi-color image based on color image data, wherein the illumination control unit controls the laser to operate at the laser energy or the wavelength to form the particular colors, wherein the tracking servo operation is disabled by adopting a fixed value as a target value for tracking control while the optical pickup forms the multi-color image, and wherein the fixed value is a constant offset voltage that is set for a tracking actuator.

2. The optical disc apparatus according to claim 1, wherein the color image data includes image information at coordinates on the disc for each color that can be formed by the color forming layer, the illumination control unit performs a single color forming control in which the laser having a characteristic that enables the color forming layer to form the color is applied to allow the color forming layer to form the color, and the illumination control unit performs a multi-color forming control in which the single color forming control is implemented for colors that can be formed by the color forming layer.

3. The optical disc apparatus according to claim 1, wherein the color image data includes image information at coordinates belonging to positions on the disc along multi-color forming portions for each color of color forming portions in the multi-color forming portions of the disc, the illumination control unit performs a single-color formation control in which based on image information at each of the coordinates for a single color, the color forming portion that forms the color is illuminated with the laser to form the color, the illumination control unit performs a multi-color formation control in which the single-color formation control is implemented for all of the color forming portions in the multi-color forming portion, and the multi-color forming control is implemented for all of the multi-color forming portions in the color forming layer.

4. The optical disc apparatus according to claim 1, wherein the color image data includes image information at coordinates corresponding to positions on the disc along annular color forming portions and which is for realizing formation of the color which is to be formed by a color forming region located at positions on the disc corresponding to the coordinates, the illumination control unit controls the optical pickup to illuminate the regions corresponding to the coordinates in a color forming portion with the laser in association with the image information at the coordinates so as to allow the color forming portion to form the color.

5. The optical disc apparatus according to claim 1, wherein the color image data includes image information at coordinates corresponding to positions on said disc along spiral color forming portions and which is for realizing formation of the color which is to be formed by a color forming region located at positions on said disc corresponding to the coordinates, the illumination control unit controls the optical pickup to illuminate the regions corresponding to the coordinates in a color forming portion so as to allow the color forming portion to form the color.

6. The optical disc apparatus according to claim 1, wherein the color image data includes image information at coordinates belonging to positions on the disc along color forming portions for each color of the color forming portions of the disc, the illumination control unit performs a single-color forming control in which based on the image information at each of the coordinates for a single color, a color forming portion that forms the color is illuminated with the laser to form the color, and the single-color forming control is implemented for all of the color forming portions.

7. The optical disc apparatus according to claim 1, further including:

a rotating unit for driving and rotating the disc to be illuminated with the laser;

a radial drive unit for moving the optical pickup in a radial direction of the disc; and a moving unit for moving a position in which the optical pickup applies the laser to the disc, wherein the illumination control unit controls, based on image information associated with one of a plurality coordinates, the laser applied from the optical pickup each time the position of illumination with the laser from the optical pickup is moved by a predetermined amount by the moving unit.

8. The optical disc apparatus according to claim 1, wherein the multi-color image is formed by using a first pulse width pulse at a first power level to form the color red, a second pulse width pulse at the first power level to form the color green, and a third pulse width pulse at the first power level to form the color blue.

9. The optical disc apparatus according to claim 1, wherein the multi-color image is formed by using a first pulse width pulse at a first power level to form the color yellow, a second pulse width pulse at the first power level to form the color cyan, and a third pulse width pulse at the first power level to form the color magenta.

10. A method of forming a multi-color image on an optical disc with a laser, the optical disc having a recording layer which complies with a given optical disc specification and which is capable of recording data upon illumination with the laser and performing a tracking servo operation during the recording of data, and a color forming layer which is capable of forming the multi-color image having a plurality of colors upon illumination with the laser, the color forming layer including color formers, which form particular colors depending upon a laser energy or wavelength applied to the color formers, the method comprising:

applying the laser to a disc placed on the optical disc apparatus;

controlling, in response to an instruction for performing image formation on the disc, the optical pickup to illuminate the color forming layer of the disc with the laser to form the multi-color image based on color image data, the multi-color image including the particular colors;

operating an optical pickup to operate at the laser energy or the wavelength to form the particular colors, and disabling the tracking servo operation by adopting a fixed value as a target value for tracking control while the optical pickup is changing the visible light characteristic, wherein the fixed value is a constant offset voltage that is set for a tracking actuator.

11. The method according to claim 10 further including:
performing a single color forming control of the laser to enable the color forming layer to form the multi-color image; and
performing a multi-color forming control in which the single color forming control is implemented for colors that can be formed by the color forming layer,
wherein the color image data includes image information at each of the coordinates on the disc for the colors that can be formed by the color forming layer.

12. The method according to claim 10, wherein in case of setting, on the optical disc apparatus, the disc, in which, in the color forming layer, annular multi-color forming portions including annular color forming portions that form a plurality of different colors are provided in a plurality of circles concentric with the disc,
the color image data includes image information at each of the coordinates belonging to positions on the disc along the multi-color forming portions for each of the colors of the color forming portions in the multi-color forming portions of the disc, and the method comprises:
performing a single-color formation control in which on the basis of image information at each of the coordinates for a single color, the color forming portion that forms the color is illuminated with the laser to form said color; and
performing a multi-color formation control in which the single-color formation control is implemented for all of the color forming portions in the multi-color forming portion, in which the multi-color forming control is implemented for all of the multi-color forming portions in the color forming layer.

13. The method according to claim 10, wherein in case of setting, on the optical disc apparatus the disc in which, in the color forming layer, color forming portions that form a plurality of different colors are respectively provided in spiral paths,
the color image data includes image information which is at each of the coordinates corresponding to positions on the disc along the annular color forming portions and which is for realizing the formation of the color which is to be formed by the color forming region located at the position on the disc in correspondence to each coordinate, and
the method includes controlling the optical pickup to illuminate the region corresponding to each coordinate in the color forming portion with the laser in association with the image information at the coordinate so as to allow the color forming portion to form color.

14. The method according to claim 10, wherein
in case of setting, on the optical disc apparatus, the disc in which the color forming layer, annular color forming portions having predetermined widths are provided in a plurality of circuits concentric with the disc, and color forming regions that form a plurality of different colors are provided in a circumferential direction thereof,
the color image data includes image information which is at each of the coordinates corresponding to positions on said disc along said spiral color forming portions and which is for realizing the formation of the color which is to be formed by said color forming region located at the position of said disc in correspondence to each coordinate, and
the method includes controlling the optical pickup to illuminate a region corresponding to each coordinate in the color forming portion with the laser in association with the image information at the coordinate so as to allow the color forming portion to form color.

15. The method according to claim 10, wherein
in case of setting, on the optical disc apparatus, the disc in which, in the color forming layer, color forming portions having predetermined widths are provided in spiral paths, and color forming regions that form a plurality of different colors are provided in a circumferential direction thereof,
the color image data includes image information at each of the coordinates belonging to positions on the disc along the color forming portions for each of the colors of the plurality of the color forming portions on the disc, and
the method includes performing a single-color forming control in which on the basis of the image information at each of the coordinates for a single color, the color forming portion that controls the color is illuminated with the laser to form the color, in which the single-color forming control is implemented for all of the color forming portions.

16. The method according to claim 10 further including:
driving and rotating the disc to be illuminated with the laser;
moving the optical pickup in a radial direction of the set-up disc;
moving the position in which the optical pickup applies the laser to the set-up disc; and
controlling, on the basis of the image information in association with one of the coordinates, the laser applied from the optical pickup each time the position of illumination with the laser from the optical pickup is moved by a predetermined amount by the moving unit.

17. The method according to claim 10, wherein the multi-color image is formed by using a first pulse width pulse at a first power level to form the color red, a second pulse width pulse at the first power level to form the color green, and a third pulse width pulse at the first power level to form the color blue.

18. The method according to claim 10, wherein the multi-color image is formed by using a first pulse width pulse at a first power level to form the color yellow, a second pulse width pulse at the first power level to form the color cyan, and a third pulse width pulse at the first power level to form the color magenta.

* * * * *